US006314507B1

(12) United States Patent
Doyle

(10) Patent No.: US 6,314,507 B1
(45) Date of Patent: Nov. 6, 2001

(54) ADDRESS GENERATION UNIT

(76) Inventor: John Doyle, Silicon Systems Limited 32-34 Harcourt Street, Dublin 2 (IE)

( * ) Notice: Subject to any disclaimer, the term of this patent is extended or adjusted under 35 U.S.C. 154(b) by 0 days.

(21) Appl. No.: 09/444,912

(22) Filed: Nov. 22, 1999

(51) Int. Cl.[7] .................................................. G06F 12/00
(52) U.S. Cl. ........................ 711/220; 711/218; 711/219; 708/708
(58) Field of Search .................................... 711/219, 218, 711/220, 211, 214; 708/708

(56) References Cited

U.S. PATENT DOCUMENTS

| 5,450,553 |   | 9/1995  | Kitagaki et al. .           |
|-----------|---|---------|------------------------------|
| 5,583,806 | * | 12/1996 | Widigen et al. ...... 708/708 |
| 5,719,803 |   | 2/1998  | Naffziger .                 |
| 5,758,178 | * | 5/1998  | Lesartre ................ 712/23 |
| 6,047,364 | * | 4/2000  | Kolagotla et al. .... 711/217 |
| 6,209,076 | * | 3/2001  | Blomgren ............ 711/214 |

FOREIGN PATENT DOCUMENTS

WO 95/00900    6/1993   (WO) .

OTHER PUBLICATIONS

Motorola Corporation ofSchaumburg, Illinois,,Manual ofDSP56300 Core,Section entitled "Address Generation Unit", pp. 4–1 through 4–12.

\* cited by examiner

*Primary Examiner*—Do Hyun Yoo
*Assistant Examiner*—Jasmine Song
(74) *Attorney, Agent, or Firm*—Richard K Robinson

(57) ABSTRACT

An Address Generation Unit (AGU) for a processor such as Digital Signal Processor that includes a data memory addressable to obtain X and Y operands and a program decoder. The AGU is connected to the data memory and the program decoder and includes two Arithmetic Logic Units that are used to generate the X and Y operands. Each alu a has a triplet of registers associated there with and include a linear path of a first DBLC adder. The first DBLC adder has an A input, a B input, a carry input connected to receive a first control signal, and a summation output. The linear path further includes a by pass connection for by passing the first DBLC adder. A multiplexer selects either the summation output or the by pass as a linear output. Each alu also includes a modulo path that is in parallel with the linear stage. The modulo path has a series connection of a Carry Sum Adder (csa) and a second DBLC adder with a modulo output. A second multiplexer selects either the linear output or the modulo output as a result. The results from the first and second alus are converted into the X and Y operands.

20 Claims, 25 Drawing Sheets

| Register Triplets |
|---|
| R0:N0:M0 |
| R1:N1:M1 |
| R2:N2:M2 |
| R3:N3:M3 |
| R4:N4:M4 |
| R5:N5:M5 |
| R6:N6:M6 |
| R7:N7:M7 |

FIG. 3

| Mn | Address Calculation Arith |
|---|---|
| XX0000 | Reverse Carry |
| XX0001 | Modulo2 |
| XX0002 | Modulo3 |
| ............ | ............ |
| XX7FFE | Modulo ($2^{15}-1$) |
| XX7FFF | Modulo $2^{15}$ |
| XX8000 | Reserved |
| XX8001 | Multiple Wrap-Around Modulo 2 |
| XX8002 | Reserved |
| XX8003 | Multiple Wrap-Around Modulo 4 |
| ............ | Reserved |
| XX8007 | Multiple Wrap-Around Modulo 8 |
| ............ | Multiple Wrap-Around Modulo $2^N$ All other values reserved |
| XX9FFF | Multiple Wrap-Around Module $2^{13}$ |
| Mn | Address Calculation Arith |
| XXBFFF | Multiple Wrap-Around Modulo $2^{14}$ |
| XXFFFF | Linear (Modulo $2^{24}$) |

FIG. 4

| Operation | Linear Adder | Modulo Adder | Carry from Linear | Carry from Modulo | Select Linear/Modulo |
|---|---|---|---|---|---|
| Rn + (+) | Rn + Nn | Rn + Nn + 1's Mn | No | No | Linear |
|  |  |  | No | Yes | Modulo |
|  |  |  | Yes | No | Modulo |
|  |  |  | Yes | Yes | Modulo |
| Rn − (−) | Rn + 1's Nn + 1 | Rn + 1's Nn + 1 + 1's Mn | No | No | Linear |
|  |  |  | No | Yes | Modulo |
|  |  |  | Yes | No | Modulo |
|  |  |  | Yes | Yes | Modulo |
| Rn − (+) | Rn + 1's Nn + 1 | Rn + 1's Nn + 1 + Mn + 1 | No | No | Modulo |
|  |  |  | No | Yes | Modulo |
|  |  |  | Yes | No | Linear |
|  |  |  | Yes | Yes | Linear |
| Rn − (−) | Rn + Nn | Rn + Nn + Mn + 1 | No | No | Modulo |
|  |  |  | No | Yes | Modulo |
|  |  |  | Yes | No | Linear |
|  |  |  | Yes | Yes | Linear |

FIG. 14

ADDRESS GENERATION UNIT

BACKGROUND OF THE INVENTION

This invention relates to digital signal processors and in particular to address generation units used to generate a location address in a memory for retrieving or storing M and Y operanda.

Examples of the prior art address generation units are U.S. Pat. No. 5,450,553 which disclosed a digital processor for processing digital signals, comprising an address generation unit for generating an address of an addressing mode which is used for processing the input digital signals; a setting unit for setting an initial value necessary for generating the address in advance in the address generation unit; and an instruction designating unit for designating only execution and stop of address generation to the address generation unit, wherein the address generation unit in which is set the initial value is so constructed as to perform execution and stop of address generation only by designation of the execution and stop outputted from the instruction designating means.

In a second example, Motorola Corporation of Schaumburg, Ill. disclosed in the manual for the DSP56300 core an Address Generation Unit (AGU). The AGU performs the effective address calculations using integer arithmetic necessary to address data operands in memory and contains the registers used to generate the addresses. The AGU implements four types of arithmetic: linear, modulo, multiple wrap-around modulo and reverse-carry and operates in parallel with other chip resources to minimize address overhead.

SUMMARY OF THE INVENTION

An Address Generation Unit (AGU) for a processor, such as Digital Signal Processor, that includes a data memory addressable by X and Y coordinates and a program decoder. The AGU is connected to the data memory and the program decoder and the AGU includes two Arithmetic Logic Units (ALU) that are used to generate the addresses of the X and Y operands. Each ALU has a triplet of registers associated therewith and includes a linear path of a first DBLC adder. The first Distributed Binary Look-Ahead Carry (DBLC) adder has an A input, a B input, a carry input connected to receive a first control signal, and a summation output. The linear path further includes a by-pass connection for by passing the first DBLC adder. A multiplexer selects either the summation output or the by-pass as a linear output. Each ALU also includes a modulo path that is in parallel with the linear stage. The modulo path has a series connection of a Carry Sum Adder (CSA) and a second DBLC adder with a modulo output. A second multiplexer selects either the linear output or the modulo output as a result. The results from the first and second ALUs are converted into the addresses of the X and Y operands.

The AGU can generate the address of the X and Y operands using one of four arithmetic methods that include: a linear, a modulo, a multiple wrap around modulo and reverse carry.

The triplets of registers include a set of control registers, a set of offset registers, and a set of modifier registers. The contents of the control registers can be offset by a value stored in an offset register and can be modified by a value stored in a modifier register. Initially, there is a base address stored in the control registers. The addresses of the X and Y operands can thus be generated by one of the following arithmetic methods:

linearly incrementing the base address by the value stored in the offset register;

modulo incrementing the base address by the value stored in the offset registers plus the one's compliment of the value stored in the modifier registers;

linearly incrementing the base address by the ones compliment of the value stored in the offset register plus one;

modulo incrementing the base address by the ones compliment of the value stored in the offset registers plus one plus the one's compliment of the value stored in the modifier registers;

linearly incrementing the base address by the one's compliment of the value stored in the offset register plus one;

modulo incrementing the base address by the ones compliment of the value stored in the offset registers plus the value stored in the modifier registers plus one;

linearly incrementing the base address by the value stored in the offset register;

modulo incrementing the base address by the value stored in the offset registers plus the value stored in the modifier registers plus one;

reversing the bit order of the base address to obtain a reverse address, reversing the bit order of the offset value stored in the offset registers to obtain a reverse offset address, incrementing the reverse address by the reverse offset address to obtain a first result, and reversing the bit order of the first result to obtain a first result address; or reversing the bit order of the base address to obtain a reverse address, reversing the bit order of the offset value stored in the offset registers to obtain a reverse offset address, obtaining the ones compliment of the reverse offset address to obtain a compliment address, incrementing the reverse address by the compliment address plus one to obtain a second result, and reversing the bit order of the second result to obtain a second result address.

DESCRIPTION OF THE DRAWINGS

Objects and advantages of the invention will become apparent upon reading the following detailed description and upon reference to the drawings, wherein like references characters are used throughout to designate like parts:

FIG. 3 s a diagram of the register triplets for the AGU of FIG. 1;

FIG. 4 is a diagram of the executable arithmetic of the AGU of FIG. 1;

FIG. 14 is a table illustrating the different modes of operation of the agu_alu of FIG. 13;

DETAILED DESCRIPTION OF THE EMBODIMENTS

Figure 1:
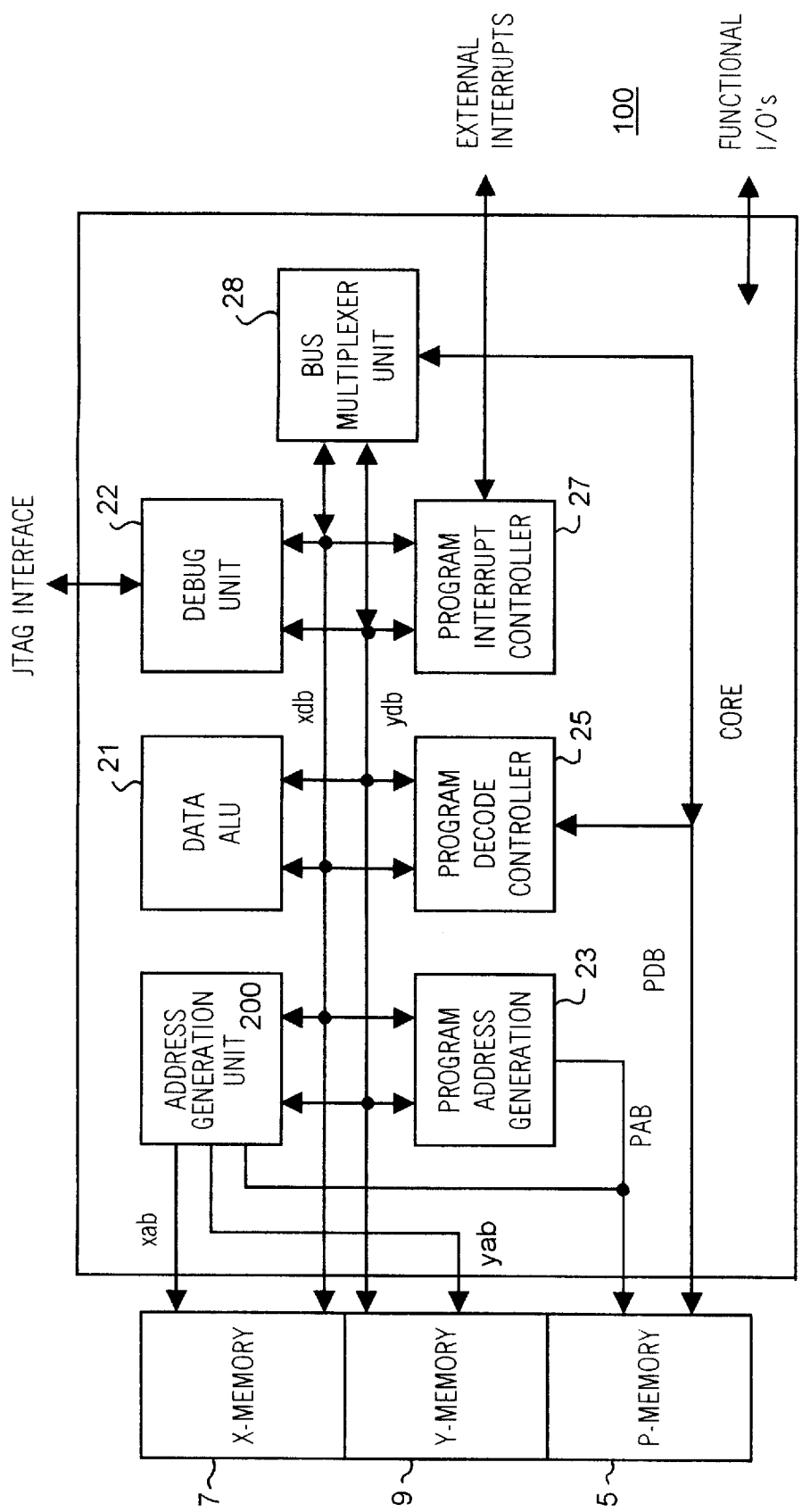
FIG. 1 is a block diagram of a DSP according to the invention.

In FIG. 1, to which reference should now be made, there is shown a block diagram of a Digital Signal Processor (DSP) 100 having incorporated an Address Generation Unit (AGU) 200 according to the invention.

The AGU 200 provides addresses to peripherals, program memory (P-Memory) 5 via bus pab, an X memory (X-Memory) 7 via buses xab, a Y memory (Y-Memory) 9 via buses yab and program address generator 23.

The three addres3 buses yab, xab and pab can also applied to an external address bus switch (not shown) for external memories (not shown).

Bus multiplexer unit 28 connects the X data bus and Y data bus to the location specified by the program decode controller 25.

Y data memory 9 provides data such as Y operands to the ydb data bus from the address provided to it by the AGU 200. Likewise, X data memory 7 provides data such as X operands to the xdb data bus from the address provided to it by the AGU 200. Program memory provides program instructions to the Program Data Bus (PDB) from the location on the Program Address Bus (PAB) provided by the address generation unit or the program address unit.

Data ALU 21 performs arithmetic operations on data provided by the data buses ydb and xdb and processes the results back to the appropriate data buses.

A Program Address Generation (PAG) 23 is connected to the Program Address Bus (PAB) and generates the address of the instruction either stored in internal memory or external to the DSP 100.

A program decoder controller 25 decodes the addressed program. Additionally, a program interrupt controller 27 controls the interrupts from external to the DSP 100 or from the Program Decode Controller (PDC) 25.

The Address Generation Unit(AGU) 200 is one of the primary blocks of the DSP 100. The AGU 200 generates the address of data operands in X and Y memories 7 and 9 respectively and is capable of driving the Program Address Bus (PAB) in the case of Jumps or data moves to/from program memory.

The AGU 200 presents the programmer with the ability to generate operand addresses using four types of arithmetic: linear, modulo, multiple wrap-around modulo and reverse carry.

Figure 2:
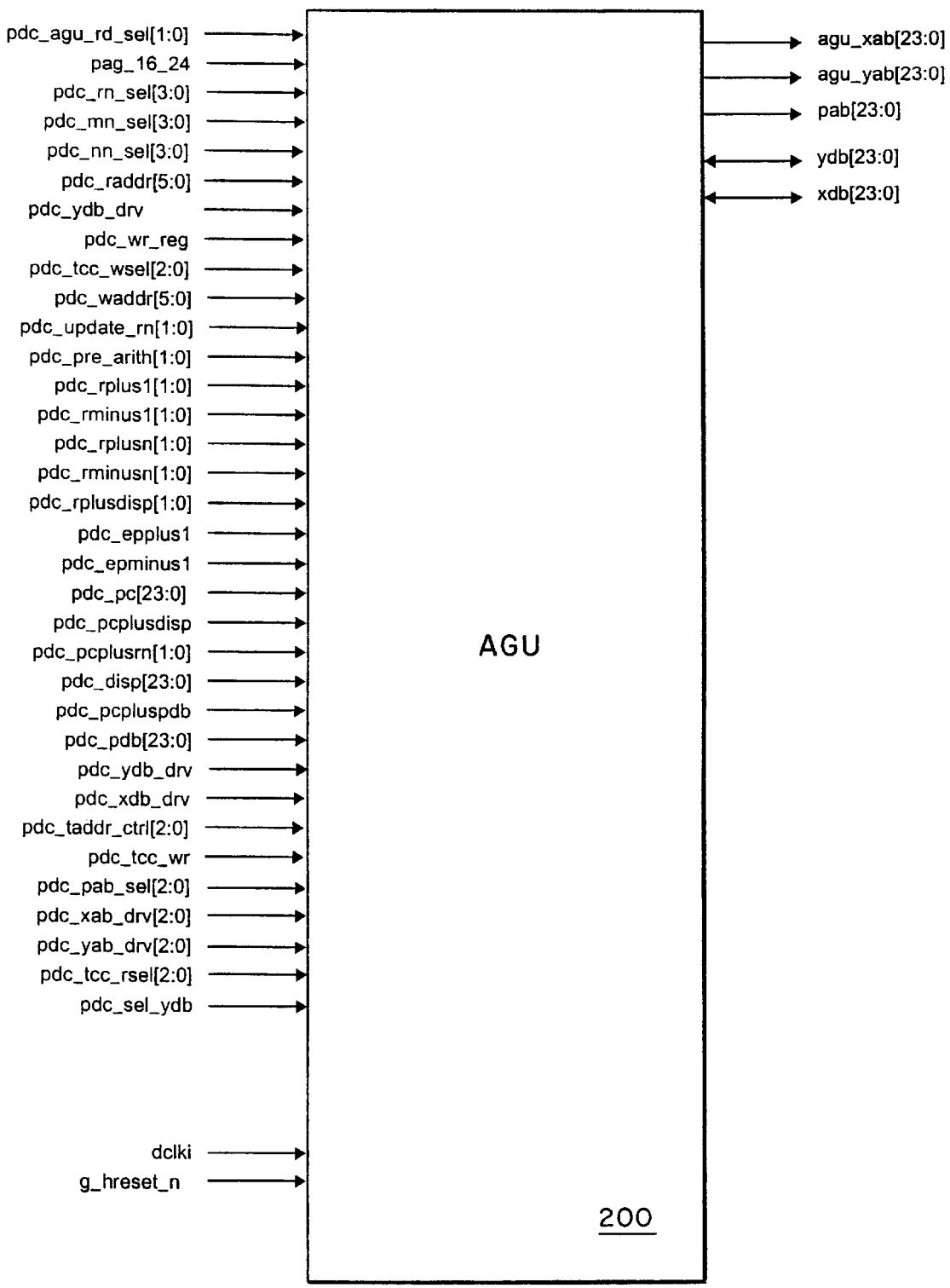
FIG. 2 is a block illustrating the signal flow to/from the AGU of FIG. 1.

FIG. 2 is a block diagram of the AGU 200 showing the input and output connections. The connections are defined as follows:

pdc_agu_rd_sel Determines the value the agu 200 should drive onto the xdb or ydb buses during a read. Active in cycle 5:
  0: Normal AGU 200 register read access.
  1: LRA/LUA instruction temporary register driven onto xdb or ydb buses.

pag_16_24 Sixteen bit compatibility mode. 1-bit from the PAG 23, bit thirteen of the status register.
  0: 24 bit mode.
  1: 16 bit mode.

pdc_rn_sel[3:0] Address register selection. 4-bits form the PDC 25. This signal is provided to the AGU 200 unregistered in cycle 3 of the internal core clock.
  pdc_rn_sel[1:0]
  00: R0, 01: R1, 10: R2, 11: R3
  pdc_rn_sel[3:2]
  00: R4, 01: R5, 10: R6, 11: R7 pdc_mn_sel[3:0] Modifier register selection. 4-bits from the PDC 25. This signal is provided to the AGU 200 unregistered in cycle 3 of the core clock.
  pdc_mn_sel[1:0]
  00; M0, 01: M1, 10: M2, 11: M3
  pdc_mn_Sel[3:2]
  00: M4, 01: M5, 10: M6, 11: M7 pdc_nn_sel[3:0] Offset register selection. 4-bits from the PDC 25. This signal is provided to the AGU 200 unregistered in cycle 3 of the core clock.
  pdc_nn_sel[1:0]
  00: N0, 01: N1, 10: N2, 11: N3
  pdc_nn_sel[3:2]
  00: N4, 01: N5, 10: N6, 11: N7 pdc_raddr[5:0] AGU 200 register selection for transfer over ydb. 6-bits from the PDC.
  010RRR=> Selects one of the R(n) registers
  011NNN=> Selects one of the N(n) registers
  100MMM=> Selects one of the M(n) registers
  101010=> Selects EP register pdc_agu_drv Enables AGU 200 to drive the pab bus. 1-bit from the PDC 25.
  1: AGU drives pab
  0: AGU drives HI-Z pdc_wr_reg Register write enable. Active High.
  This is used in conjunction with the pdc_waddr[5:0] to select a destination register for a write access.

pdc_waddr[5;0] Selects one of the internal registers.
  6-bits from PDC 25. The value present on ydb or xdb is transferred to the selected register at the end of cycle 6 of the core clock provided the pdc_wr_reg is valid.
  010RRR=> Selects one of the R(n) registers
  011NNN=> Selects one of the N(n) registers
  100MMM=> Selects one of the M(n) registers
  101010=> Selects EP register pdc_tcc_wsel[2:0] Selects one of the R(n) registers as the destination of the internal AGU transfer bus. 3-bit from the PDC 25.

pdc_tcc_rsel[2:0] will be used to select the source R (n) lto the transfer. The transfer is qualified by pdc_tcc_wr. AGU internal transfer occurs in cycle 7 of the core clock.

pdc_update_rn[1:0} Enables R(n) updates. 2-bits from the PDC which controls lower alu and upper alu. An active level on pdc_update_rn[1:0} implies that R(n) will be updated after the current arithmetic operation is performed.
Valid in cycle 4 of the core clock from the pdc 25.

pdc_pre_arith[1:0] Signifies that the current arithmetic operation in the AGU 200 is a pre arithmetic operation. MSB upper alu and LSB lower alu. Active during a −(R(n)), (R(n)+N(n)) (PC+displ) and (PC+R(n)) operation.

pdc_rplus[1:0] Increment the R(n) registers by 1. 2-bit control from PDC 25. LSB controls lower alu and MSB controls upper alu.
This signal is provided to the AGU in cycle 3 of the core clock and is registered in the AGU on the rising edge of cycle 4.

pdc_rminus[1:0] Decrement the R(n) registers by 1. 2-bit control from PDC 25. LSS controls 28 the lower alu and MSD controls upper alu. This signal is provided to the AGU 200 in cycle 3 and is registered in the AGU 20 on the rising edge of cycle 4.

pdc_rplusn[1:0] Increment the R(n) registers by the respective N(n) register. LSB controls the lower alu and MSB controls upper alu. This signal is provided to the AGU in cycle 3 and is registered in the AGU on the rising edge of cycle 4.

pdc_rminusn[1:0] Decrement the R(n) registers by the 6 respective N(n) register. LSB controls the lower alu and Mgg controls the a upper alu. This signal is provided to AGU in cycle 3 and is registered in the AGU on the rising edge of cycle 4.

pdc_rplusdisp[1:0] Contents of the R(n) register is added to a 24-bit displacement to produce an address. 2-bit control from PDC. LSB specifies that the displacement is to be added to one of R0–R3, MSB specifies R4–R7. This signal is provided to the AGU 200 in cycle 3 and is registered in the AGU 200 on the rising edge of cycle 4.

pdc_epplus1 Increment Extension Pointer (EP) by one. 1-bit control from PDC. EP is increment by one and updated. This signal is provided to the AGU in cycle 4 and is a register input to the AGU.

pdc_epminus1 Decrement Extension Pointer (EP) by one. 1-bit control from PDC 25. EP is decremented by one and updated. This signal is provided to the AGU 200 in cycle 4 and is a register input to the AGU 200.

pdc_pc[23:0] Program Counter. 24-bit value from PDC 25. Signifies the address of the last instruction prefetch.

pdc_pcplusdisp The program counter is incremented by pdc_disp[23:0}. 1-bit control from PDC 25. The resultant value can be driven onto the pab. This signal is provided to the AGU in cycle 4 and is a register input to the AGU.

pdc_pcplusrn[1:0] Add the program counter to the R(n) register. 1-bit control from PDC 25. The R(n) register is not updated. The resultant value can be driven onto the pab. This signal is provided to the AGU in cycle 4 and is a register input to the AGU 200. MSS selects upper file and LSB selects lower file. Active high.

pdc_disp[23:0} Displacement value. 24-bit value from PDC 25. Provides the displacement in PC relative modes and is used as an address in special address modes which can be driven onto one of the address buses.

pdc_pcpluspdb Add the program counter to the value on pdc_pdb[23:0]. This signal is provided to the AGU 200 in cycle 4 and is a register input to the AGU.

pdcpdb[23:0] rogram data bus register from PDC.

pdc_ydb_drv Drive ydb if it's a valid agu access. 1-bit control from the PDC. Active high.

pdc_xdb_drv Drive xdb if its a valid agu access. 1-bit control from the PDC. Active high.

pdc_sel_ydb On a write access it selects the source bus as either ydb or xdb.
0: xdb
1: ydb pdc_taddr_ctr[2:0] Temporary Register source selection from PDC 25. Unregister.
000/100/111: Hold Previous Value
001/010: Displacement
011: Extension Pointer ALU
101: Lower R(n) ALU
1710: Upper R(n) ALU pdc_tcc_wr Validates an internal AGU transfer. Active in cycle 7.

pdc_pab_sel[2:0] Determines the source of the address to be drive onto the PAB in either cycle 4/5. 3-bit select from PDC 25. Registered from PDC 25.
000/100/111: Temporary Register
001: Displacement
010: Displacement
011: Extension Pointer ALU
101: Lower R(n) ALU
110: Upper R(n) ALU pdc_xab_drv[2:0] Select address source for X memory 7 address bus (xab). 3-bit select from PDC 25. Active in cycle 4. Unregistered fromu PDC 25.
000/100: Hold Previous Value
001/010: Displacement
011: Extension Pointer
101: Lower R(n) ALU
110: Upper R(n) ALU
111: Temporary Register pdc_yab_drv[2:0] Select address source for Y memory 9 address bus yab. 3-bit select from PDC 25. Active in cycle 4. Unregistered from PDC 25.
000/100: Hold previous value
001/010: Displacement
011: Extension Pointer
101: Lower R(n) ALU
110: Upper R(n) ALU
111: Temporary Register pdc_tcc_rsel[2:0] Selects destination for internal AGU 20 transfer between R(n) registers on a tcc instruction.

dclki Core clock.

g_hreset_n Global core reset. Active low.

AGU OUTPUTS agu_xab[23:0] X memory 7 address. 24-bit address from AGU 200.

agu_yab[23:0] Y memory 9 Address. 24-bit address from AGU 200.

pab[23:0] Program address bus (PAB). 24-bit address from AGU 200.

BI-DIRECTIONAL ydb[23:0] Y-Memory data bus.

xdb[23:0] X-Memory data bus.

The AGU 200 is divided into two halves, each contains its own ALU unit and control registers. The control registers, as shown in FIG. 3, can be split into three groups, address register (R0–R3 and R4–R7), offset registers (N0–N3 and N4–N7) and the modifier registers (M0–M3 and M4–M7). These registers work as a triplet to generate operand address (e.g. only N0 and M0 can be used to update R0).

The control registers are accessible (r/w) over the Y-memory bus(ydb)and X-memory bus (xdb). The AGU 200 has the capability of generating two 24 bit addresses every instruction cycle which allows two data operands to be fed to the data ALU 21 every cycle. Each operand can be addressed by a register triplet. An internal bus to the AGU 200 allows transfer of address registers.

Address register files (R0–R3 and R4–R7) are shown in FIG. 3. The address registers R0–R7 can contain address or general purpose data. The contents of R(n), where n can be 0 through 7, may point directly or may be an offset to data. When supporting parallel X and Y memories 7 and 9 access the address register of FIG. 3. The address registers must be thought of as two separate files: R0–R3 and R4–R7. R(n) is typically updated in a read modify write manner i.e. the content of R(n) are read (address source for operand) its contents are modified by one of the four available arithmetic types and the registers are then written with the results.

The offset register files (N0–N3 and N4–N7) of FIG. 3 can contain offset values used to increment or decrement the address registers (R(n)) during R(n) update calculations. N(n) can be used as a general purpose 24-bit register. Each N(n) register is associated with the appropriate R(n) register.

With regard to the modifier register files (M0–M3 and M4–M7), the modifier registers M0–M7 define the type of address arithmetic to be performed for addressing mode calculations or they can be used as general purpose registers. The DSP 100 supports four types of arithmetic; linear, modulo, reverse carry and multi wrap-around modulo. Each M(n) register is associated with the appropriate R(n) register. On DSP reget the M(n) register is reget to $FFFFFF whereas R(n) and N(n) are reset to zero, which can be the initial base address for R(n).

The address modifier encoding is defined in FIG. 4.

Reverse Carry (M(n)=$XX0000): This type of arithmetic is performed by propagating the carry in the reverse direction (ie. from the MSB to LSB). Reverse carry is implemented by reversing the inputs and performing a linear add and then reversing the output.

Referring to FIG. 4, Modulo M arithmetic causes the address register value to remain within an address range of size M defined by a lower and upper address boundary. The value m=M−1 is stored in the modifier Register (M(n)). The base address must have zeros in the K LSBs, where $2^K >= M$, and therefore must be a multiple of $2^K$. The upper boundary is the lower boundary plus the modulo size minus one. Since $M<=2^K$ there will be a space between circular buffers of $(2^K)-M$. During normal operations, if the address register increments past the upper boundary of the buffer, it will wrap through the base address. If an offset N(n) is used in the address calculations, then the moduluo of N(n) must be less than M for proper modulo addressing. If N(n)>M, the result is unpredictable except in the special case where $N(n)=P \times 2^K$ a multiple of block size where P is a positive integer. For this special case, when using (R(n))+N(n) (N(n) must be a positive number) addressing mode, the pointer R(n) will jump to same relative location in a new buffer.

Similarly, for (R(n))−N(n) (where N(n) is positive) the pointer will jump P block backward in memory. In these cases, if N(n) is negative the results are unpredictable.

Multiple wrap around arithmetic where M may be any power of 2 in the range of $2^1$ to $2^{14}$. The lower boundary must have zeros in the K LSBs, where $2^K=M$, and therefore must be a multiple of $2^K$. If an offset N(n) is used in the address calculation, it is not required to be less than or equal to M for proper modulo addressing since multiple wrap around is supported, the programmer is restricted to within one buffer.

Linear (M(n)=XXFFFF) is for normal 24-bit linear arithmetic.

ADDRESSING MODES

The addressing modes supported by the AGU 200 include:

1.) the Address Register of FIG. 3 indirect and the operations possible in the Address Register indirect are: No update (R(n)), Postincrement by 1 (R(n))+ or an offset (R(n))+N(n), Postdescrement by 1 (R(n))− or an offset (Rn) N(n), Index by an offset (R(n)+N(n)) and Predecrement by 1−(Atn)): and 2.) the Short/Long Displacement (R(n)+displ)

Register Direct specifies any of the programmer's view registers inside the core explicitly in the instruction so no address is required for accessing memory space.

PC Relative

Add the content of the PC to a displacement or an address register (R(n)) to form an address which may be driven onto any of the three address buses (pab, agu_xab and agu_yab)

Absolute addressing

Absolute addressing is performed by the use of an extension word in the instruction. This extension word may be driven onto any of the three address buses.

Absolute short address

A 6-bit absolute short address field is extracted from the instruction word and is zero extended.

Short Jump address

A 12-bit field which is embedded in the instruction word as a location in the program space to which the program should jump.

Short I/O Addressing

A 7-bit field is used to access an area at thus top of the X and Y address spaces i.e. $FFFFF8–$FFFFFF.

All arithmetic operations are performed in the AGU 200 address ALU's.

Figure 5:
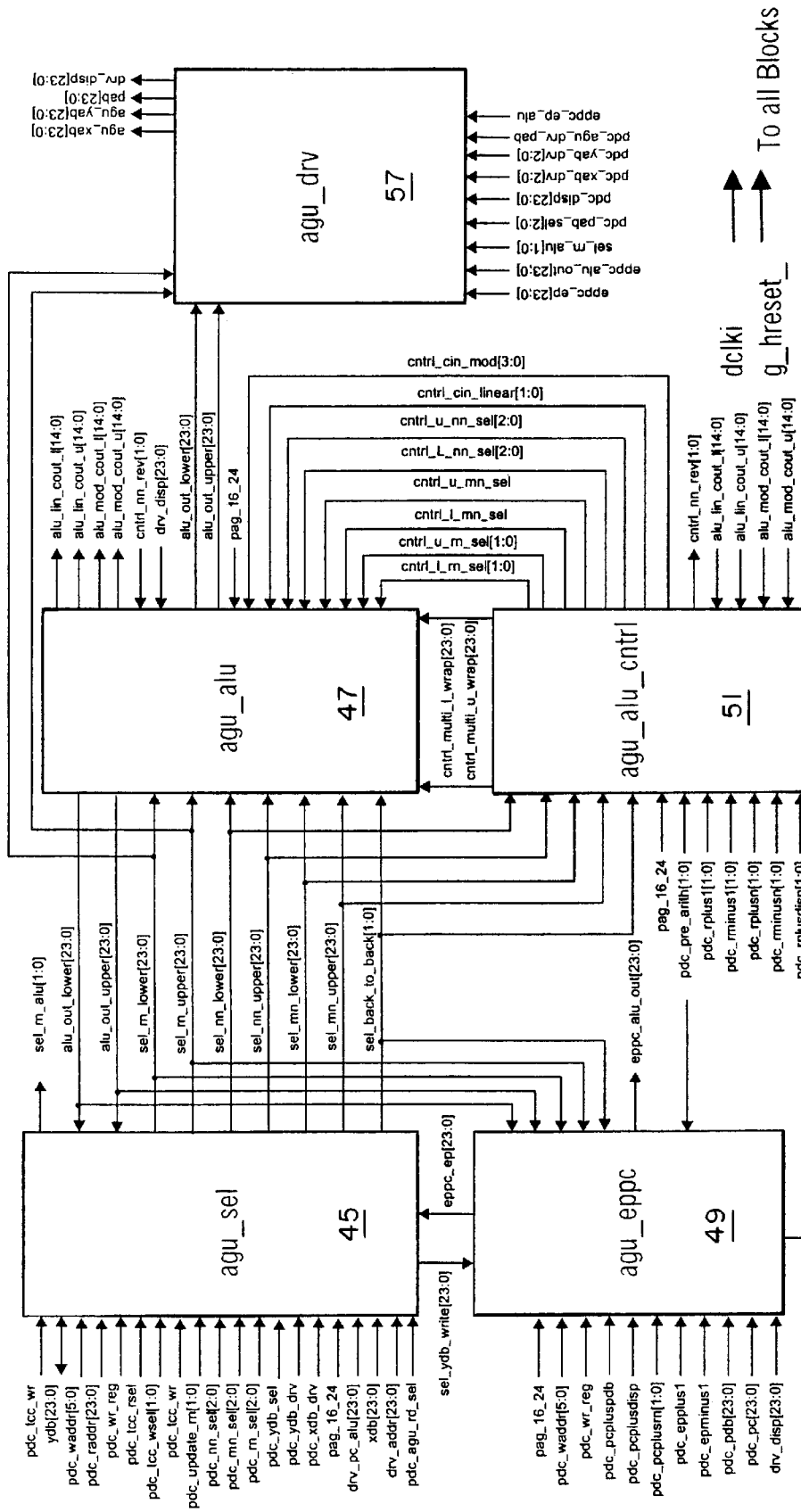
FIG. 5 is a block diagram of the AGU.

FIG. 5, to which reference should now be made, is a block diagram of the AGU 200 and comprises an agu_sel block 45, an agu_alu block 47, an agu_eppc block 49, an agu_alu_cntrl block 51 and an agu_drv block 57.

Figure 6:
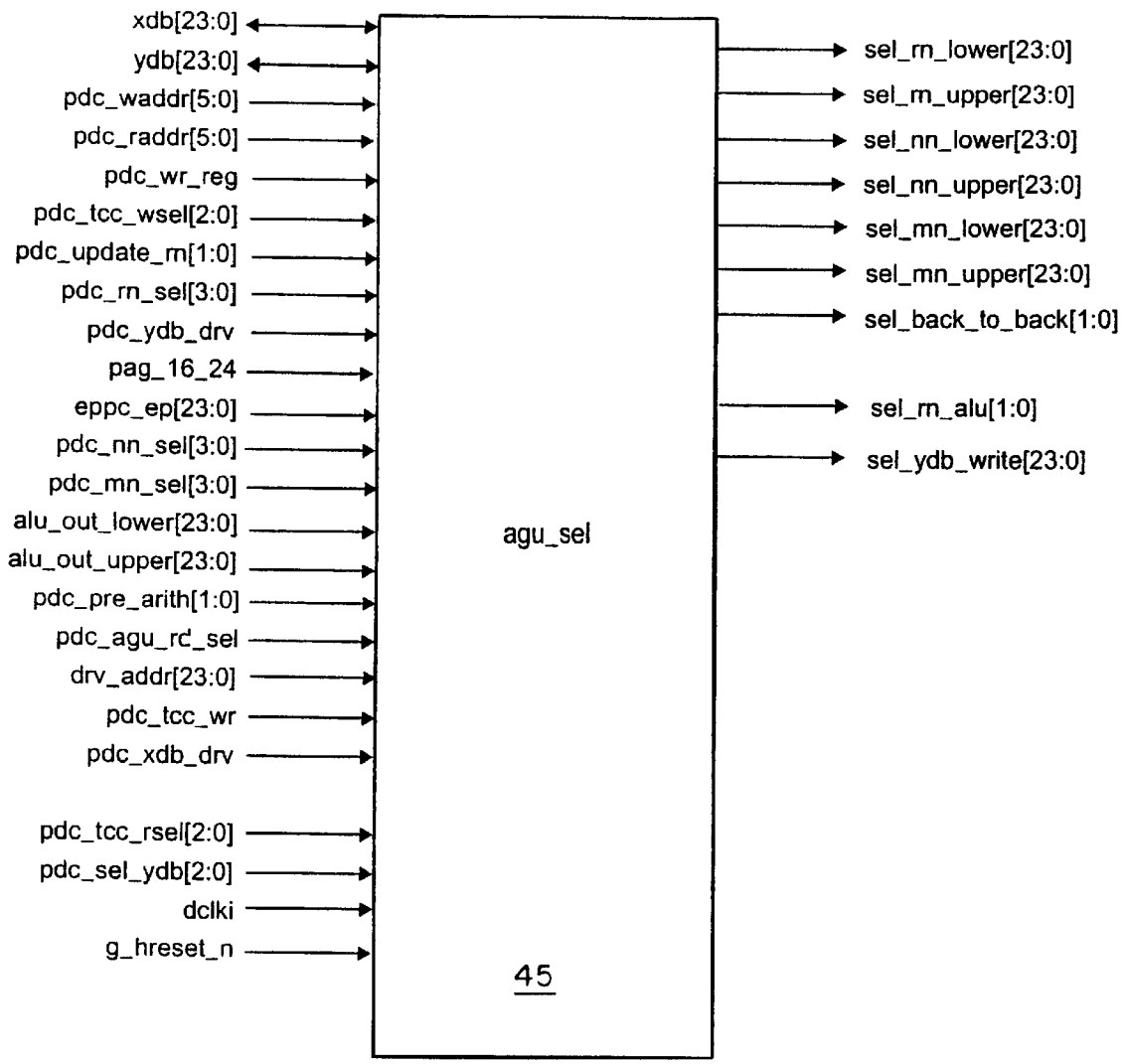
FIG. 6 is a block diagram of signal inputs and outputs of the agu_sel of FIG. 5.

FIG. 6 is a block diagram of the agu_sel block 45 with its inputs and outputs defined as follows.

pdc_waddr[5:0] Selects one of the internal core registers. 6-bits from PDC 25. The value present on ydb or xdb buses is transferred to the selected register at the end of cycle 6 provided the pdc_wr_reg is valid.

010RRR=> Selects one of the R(n) registers

011NNN=> Selects one of the N(n) registers

100MMM=> Selects one of the M(n) registers

101010=> Selects EP register pdc_raddr[5:0] AGU register selection for transfer over ydb. 6-bits from the PDC 25. Address provided in cycle 6.

010RRR=> Selects one of the R(n) registers
011NNN=> Selects one of the N(n) registers
100MMM=> Selects one of the M(n) registers
101010=> Selects EP register pdc_wr_reg Core register write enable. Active High. This is used in conjunction with the pdc_waddr[5:0] to select a destination register for a write access.

pdc_tcc_wsel[2:0] Selects one of the R(n) registers as the destination of the internal AGU transfer bus. 3-bit from the PDC 25. pdc_tcc_rsel[2:0] will be used to select the source R(n) for the transfer. The transfer is qualified by pdc_tcc_wr. AGU 200 internal transfer occurs in cycle 7.

pdc_update_rn[1:0] Enables R(n) updates. 2-bits from the PDC 25 which control lower alu and upper alu. An active level on pdc_update_rn[1:0} implies that R(n) will be updated after the current arithmetic operation is performed. Valid in cycle 4 from the PDC 25.

pdc_rn_sel[3:0] Address register selection. 4-bits form the PDC 25. This signal is provided to the AGU unregistered in cycle 3.
pdc_rn_sel[1:0]
00: R0, 01: R1, 10: R2, 11: R3
pdc_rn_sel[3:2]
00: R4, 01: R5, 10: R6, 11: R7 pdc_ydb_drv Drive ydb if it's a valid agu access. 1-bit control from the PDC 25. Active high.

pag_16_24 Sixteen bit compatibility mode. 1-bit from the PAG 23, bit thirteen of the status register.
0: 24 bit mode.
1: 16 bit mode.

eppc_ep[23:0] Extention Pointer. 24-bit value. This value is transferred over the ydb bus during a move operation.

pdc_mn_sel[3:0] Modifier register selection. 4-bits from the PDC 25. This signal is provided to the AGU unregistered in a cycle 3.
pdc_mn_sel[1:0]
00: M0, 01: M1, 10: M2, 11: M3
pdc_mn_Sel[3:2]
00: M4, 01: M5, 10: M6, 11: M7 pdc_nn_sel[3:0] Offset register selection. 4-bits from the PDC 25. This signal is provided to the AGU unregistered in cycle 3.
pdc_nn_sel[1:0]00: N0, 01: N1, 10: N2, 11: N3
pdc_nn_sel [3:2]
00: N4, 01; N5, 10: N6, 11: N7 alu_out_lower[23:0] ALU 200 lower file output (R0–R3). Contains the output of the ALU 200 after the current arithmetic operation. This value is used to update R(n) (R0–R3).

alu_out_upper[23:0] ALU 200 upper file output (R4–R7) Contains the output of the ALU after the current arithmetic operation. This value is used to update R(n) (R4–R7).

pdc_pre_arith[1:0] Signifies that the current arithmetic operation in the AGU 200 is a pre arithmetic operation. MSB upper alu and LSB lower alu. Active during a −(R(n)), (R(n)+N(n)) (PC+displ) and (PC+R(n)) operation.

pdc_agu_rd_sel Determines the value the agu should drive onto the xdb or ydb during a read. Active in cycle 5.
0: Normal AGU register read access.
1; LRA/LTA instruction temporary register driven onto xdb or ydb.

drv_addr[23:0] Upper or lower ALU output for LUA instructions.

pdc_tcc_wr Validates an internal AGU transfer. Active in cycle 7.

pdc_xdb_drv Drive xdb if its a valid agu access. 1-bit control from the PDC 25. Active high.

pdc_pc_alu Same as AGU input.

pdc_tcc_rsel[2:0] Selects destination for internal AGU transfer between R(n) registers on a tcc instruction.

pdc_sel_ydb On a write access it selects the source bus is either ydb or xdb.
0: xdb
1: ydb dclki Core clock 100 MHz.

g_hreset_n Global core reset. Active low.

OUTPUTS sel_rn_lower[23:0] One of 4 possible R(n) inputs to the lower alu. Selection is dependent on the value of pdc_rn_sell[1:0].

sel_rn_upper[23.0] One of 4 possible R(n) inputs to an upper alu. Selection is dependent on the value of pdc_rn_sel[3:2].

sel_mn_lower[23:0] One of 4 possible M(n) inputs to the lower alu. Selection is dependent on the value pdc_mn sel[1:0].

sel_mn_upper[23:0 ] One of 4 possible M(n) inputs to the upper alu. Selection is dependent on the value pdc_mn_sel[3:2].

sel_nn_lower[23:0] One of 4 possible N(n) inputs to the lower alu. Selection is dependent on the value of pdc_nn_sel[1:0].

sel_nn_upper[21:0] One of 4 possible M(n) inputs to the upper alu. Selection is dependent on the value of pdc_nn_sel[3:2].

sel_back_to_back[1:0] Selects the alu output as the alu input instead of an R(n) value. MSB for upper alu and LSB for lower alu. This is used in the case of a back to back operation on the same address resister.

sel_rn_alu[1:0] Alu output selection for bus driver. Select between the R(n) register file and the alu output. In the case of a pre arithmetic operation, the alu output is always selected. In the case of a post arithmetic operation, the R(n) register file or alu output may be the Source address for the bus driver.

sel_ydb_write[23:0] Either xdb or ydb depending on pdc_sel_ydb.

BI-DIRECTIONAL ydb[23:0] Y-Memory data bus
xdb[23.0] X-Memory data bus

The functions performed by the agu_sel block 45 are: selecting one triplet for each Address ALU; controlling ydb access to internal AGU registers; updating to R(n) register file, internal AGU transfer Bus operation; ALU control; and clock gating of the R(n)/M(n) and N(n) Register file to reduce power consumption Derivation of the internal enable signals is based on the assumption that the program decode controller 25 does not allow conflicts in the AGU 200, (i.e. it should not be possible for the same internal address register (R(n)) to be accessed by the ydb, internal AGU 200 transfer bus and update bus on the same clock cycle). It is the responsibility of the program decode controller 25 to prevent this condition from occurring by delaying the decode of the current instruction by the appropriate number of clock cycles.

Figure 11:
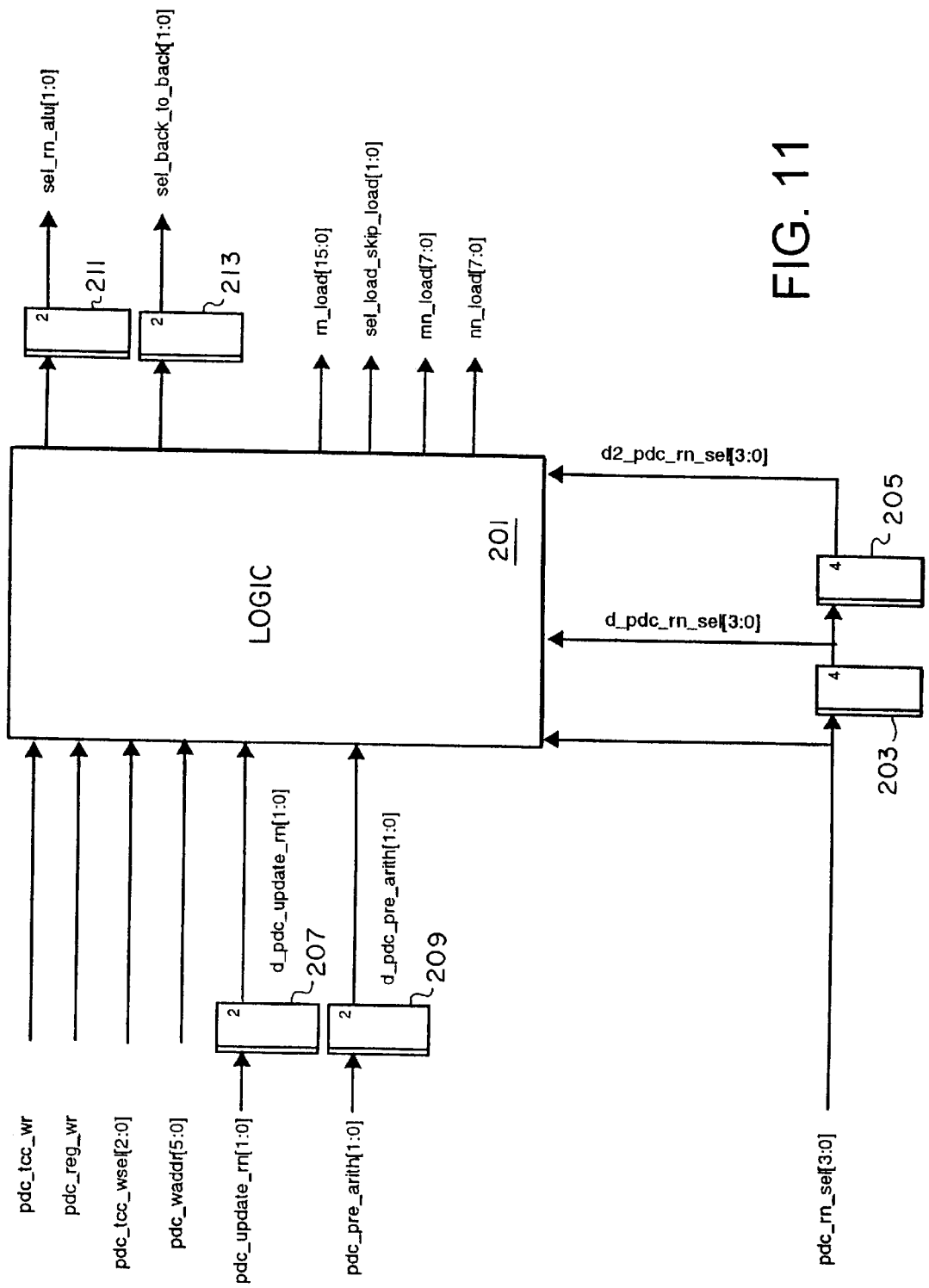
FIG. 11 is a is a schematic diagram of the AGU register selection of FIG. 6.
Figure 12:
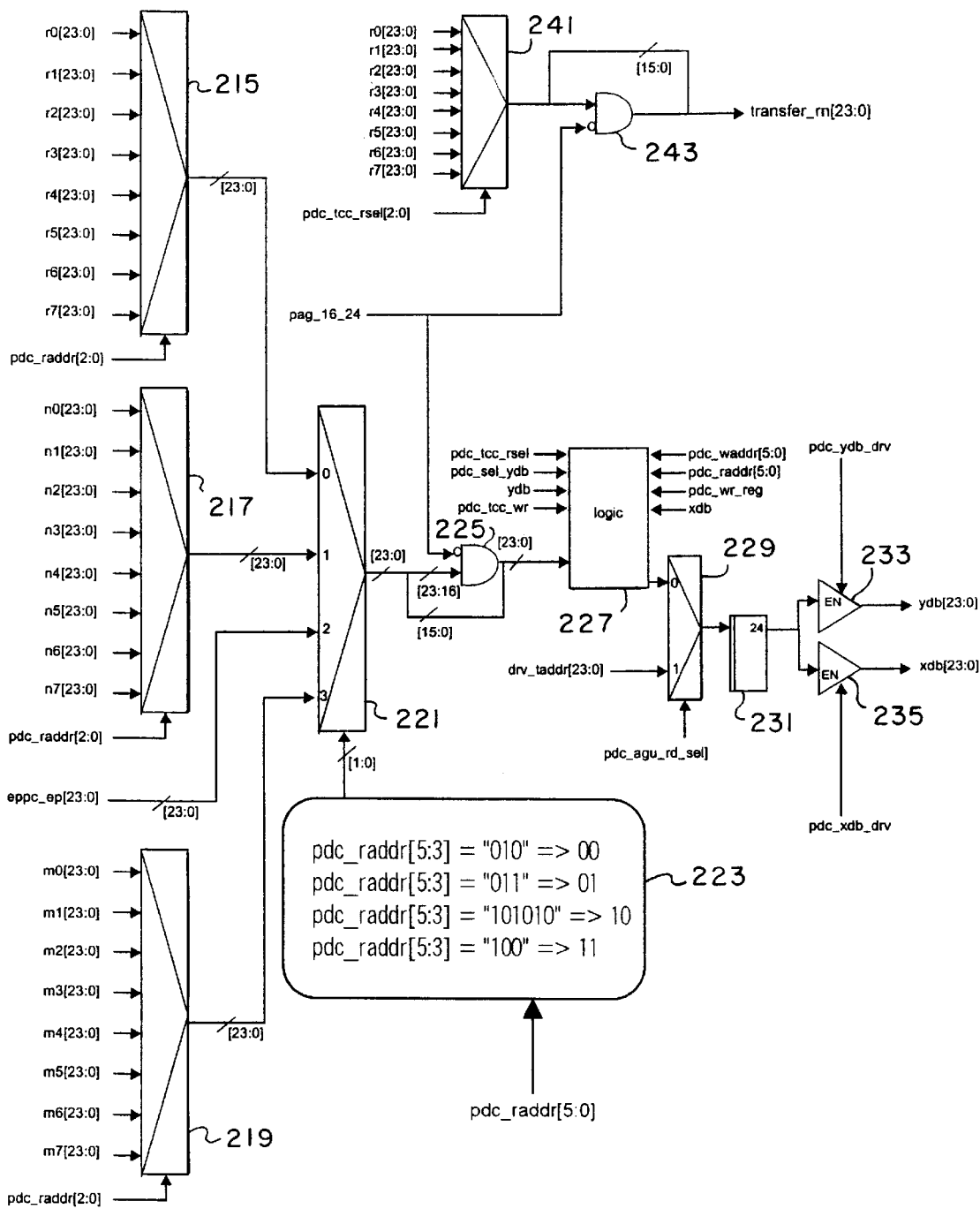
FIG. 12 is a schematic diagram of AGU bus selection.

The agu_sel block 45 is comprised of a lower ALU address register (R(n)) selection circuit (FIG. 7), an upper ALU address register (R(n)) selection circuit (FIG. 8), a modifier register (N(n)) selection circuit (FIG. 9), a modifier register (N(n)) selection circuit (FIG. 10), AGU register selection circuit (FIG. 11) and internal AGU transfer bus and external read circuit (FIG. 12).

Figure 7:
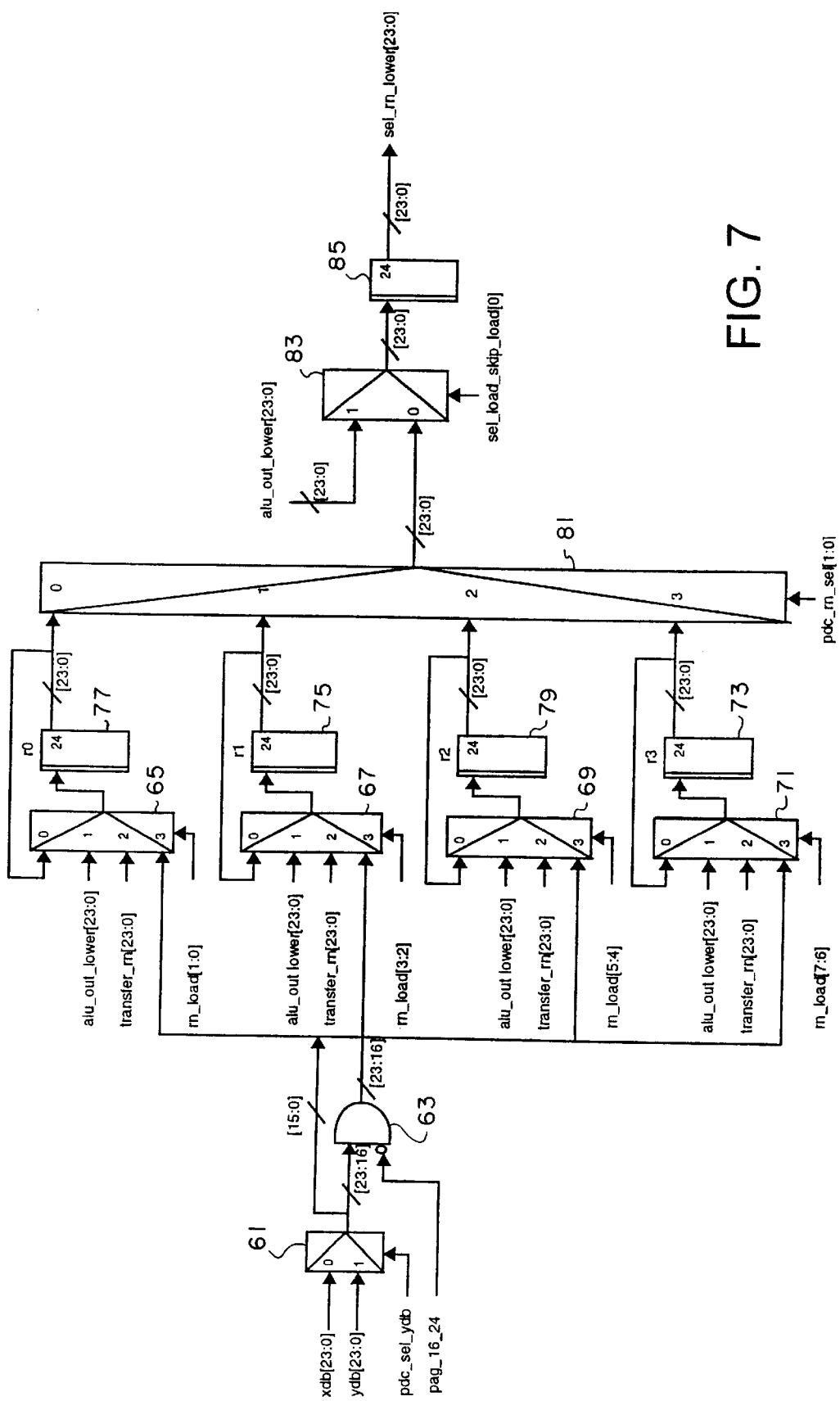
FIG. 7 is a schematic diagram of the lower_alu selection of FIG. 6.

Referring to FIG. 7, selection of the ALU address R(n), where n can be equal to 0 through 7, is provided by the circuit of FIG. 7. A multiplexer 61 selects either the xdb or ydb depending on the state of pdc_sel_ydb. The output of the multiplexer 61 (bits 23 through 16) is tested for compatibility by AND gate 63 and the pag_16_24 signal. The output of the AND gate 63 and bits 15 through 0 are applied to one of four multiplexers 65, 67, 69 and 71.

Eash of the one of four multiplexers select either a feed back of the previous output, alu_out_lower, transfer_rn which originates in the internal AGU transfer bus circuit of FIG. 12. The control of the one of four multiplexers 65, 67, 69 and 71 is controlled by the rn_load command that originates in the AGU register selection circuit of FIG. 11.

The outputs of the one of four multiplexor 65 is stored in latch 77, multiplexer 67 in latch 75, multiplexer 69 in latch 79 and multiplexer 71 in latch 73. The outputs of the latches 77, 75, 79 and 73 are applied to one of the four multiplexer 81 which output is selected by the pdc_m_sel. The output of the one of four multiplexer 81 is applied to the one of two multiplexer 83 which selects either the output of the one of four multiplexer 81 or alu_out_lower. The output 85 is designated as sel_rn_lower.

Figure 8:
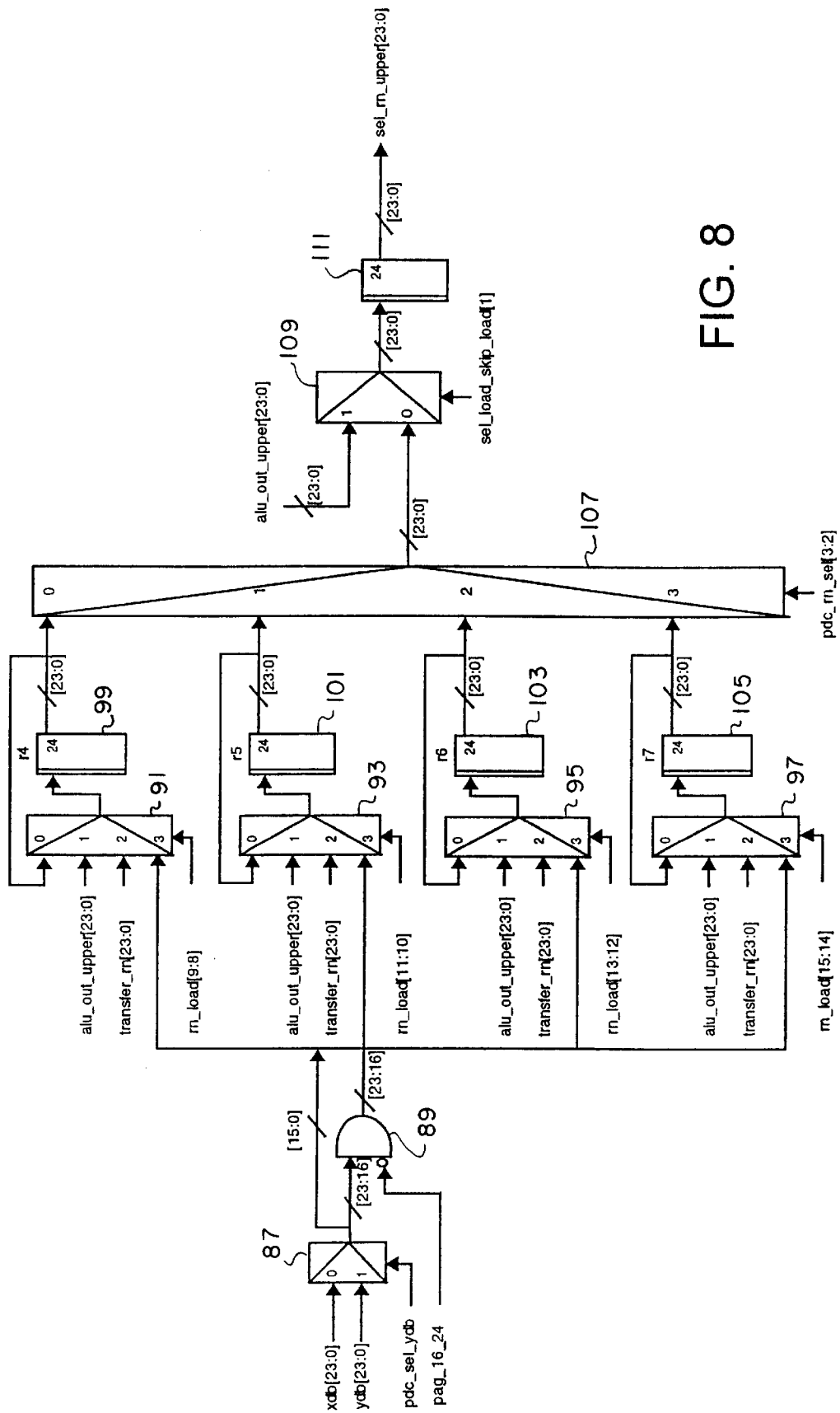
FIG. 8 is a schematic diagram of the upper_alu selection of FIG. 6.

The upper address is generated by the circuit of FIG. 8, to which reference should now be made, which operates in a similar manner as the lower address selection of FIG. 7. In particular, the outputs of one of two multiplexers 87 and AND gate 89 are applied to one of four multiplexers 91, 93, 95 and 97. The one of four multiplexers selects either a feedback of the previous selected output, alu_out_upper, transfer_rn under the control of rn_load. The selected output of multiplexer 91 is stored in latch 99, the selected output of multiplexer 93 is stored in latch 101, the selected output of multiplexer 95 is stored in laeth 103 and the selected output of multiplexer 97 is stored in latch 105.

One of four multiplexer 107 passes the outputs of latch 99, 101, 102 and 105 depending upon pdc_rn_sel. The output of one of four multiplexer 107 is applied to one of two multiplexer 109 which selects either the output of the multiplexer 107 or alu_out_upper. The output of one of two multiplexers 109 is stored in latch 111 which is designated as sel_rn_upper.

Figure 9:
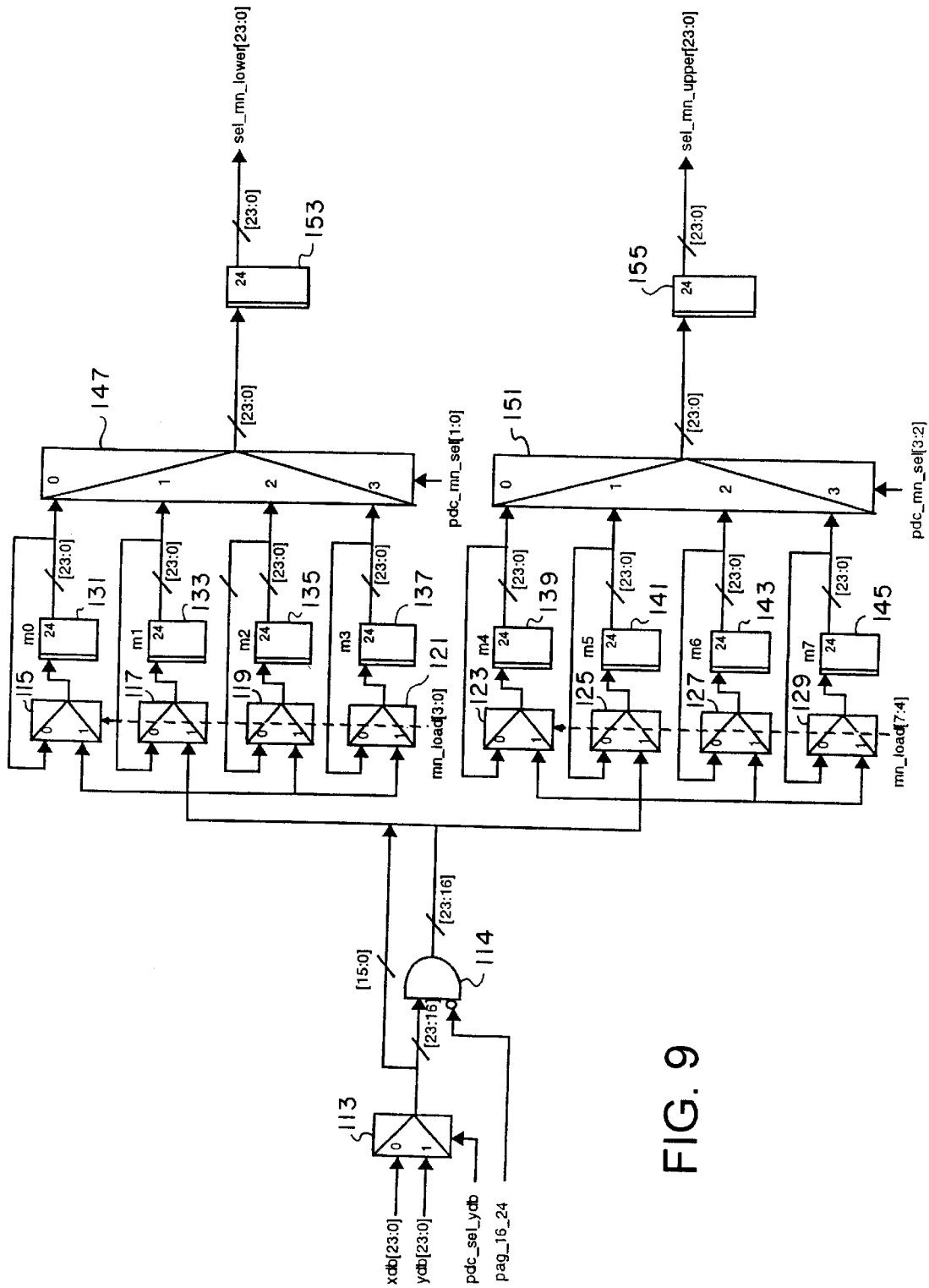
FIG. 9 is a schematic diagram of the modified register selection of FIG. 6.

FIG. 9 is a schematic diagram of modifier register (M(n)) selection circuitry. The outputs of one of two multiplexers 113 and AND gate 114 are applied to one of two multiplexers 115, 117, 119, 121, 123, 125, 127 and 129 which select this as an output or the previous output from the latches 131, 133, 135 and 137.

The output multiplexers 115, 117, 119 and 121 are selected by mn_load [3:0] and applied to latch 131, 133, 135 and 137 respectively. Multiplexer 147 selects the output of latch 131, 133, 135 and 137 under the control of the pdc_mn_sel [1:0] for storage in latch 153 as sel_mn_lower.

The outputs of multiplexers 123, 125, 127 and 129 are selected by mn_load [7:4] and applied to latches 139, 141, 143 and 145 respectively. Multiplexer 151 selects, under the control of pdc_mn_sel [3:2], an output from either latches 139, 141, 143 or 145 and its output is stored in latch 155 as sel_mn_upper.

Figure 10:
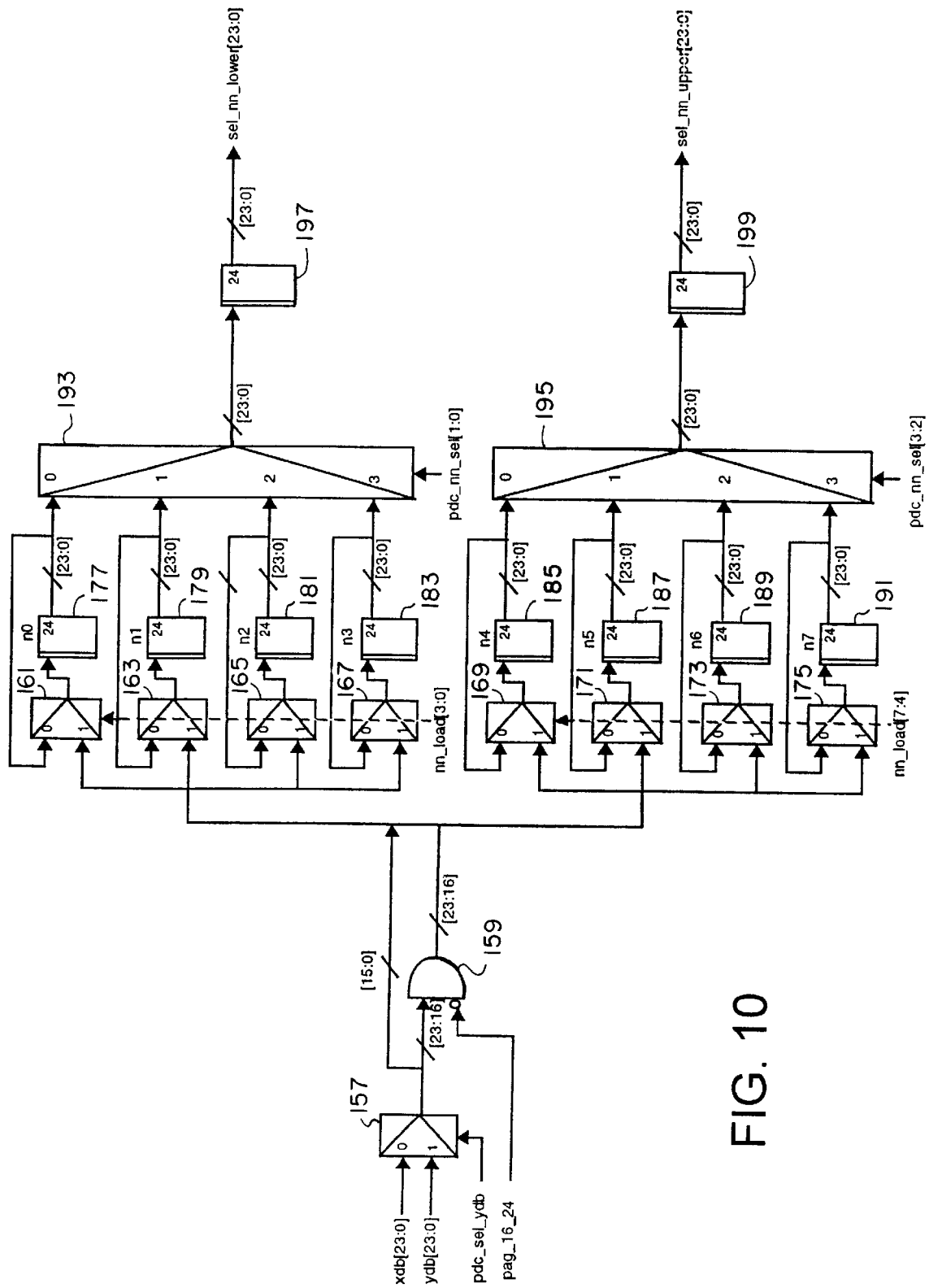
FIG. 10 is a is a schematic diagram of the offset register selection of FIG. 6.

FIG. 10 is a schematic diagram of the offset register (N(n)) selection circuit. The outputs of one of two multiplexers 157 and AND gate 159 are applied to multiplexers 161, 163, 165, 167, 169, 171, 173 and 175 which select either the applied input or its previous output. The selection for multiplexers 161, 163, 165 and 167 is made by the signal nn_load [3:0] and multiplexers 169 171, 173 and 175 by signal nn_load [7:4].

The outputs of multiplexers 161, 163, 165, 167, 169, 171, 173 and 175 are applied to and stored in latches 177, 175, 191, 195, 197, 199 and 191 respectively.

Multiplexer 193 under the control of pdc_nn_sel [1:0] selects one of the outputs of latches 177, 179, 181 or 183 and stores it in latch 197 as sel_nn_lower. Multiplexer 193 selects one of the outputs of latches 18S, 187, 189 and 191, under the control of pdc_nn_sel [3:22] and stores it in latch 199 as sel_nn_upper.

In FIG. 11, to which reference should now be made, logic 201 receives pdc_rn_sel [3:0] the same with 1 clock delay, d_pdc_rn_sel [3:0] output from latch 203 and it is the same with 2 clock delay, d2_pdc_rn_sel [3:0] and output from latch 205.

Additionally, the logic 201 receives pdc_tcc_wr, pdc_reg_wr, pdc_tcc_wsel [2:0], pdc waddr [5:0], and 1 clock delay of pdc_update_rn[1:0] from latch 207 and 1 clock delay of pdc_pre_arith[1:0] from latch 209. The output of logic 201 is sel_rn_alu [1:0] from latch 211, sel_back_to_back [1:0] from latch 213, rn_load [15:0], sel_load_skip_load [1:0], mn_load [7:0] and nn_load [7:0]. This block is responsible for selecting which R(n)/N(n)/M(n) registers is to be updated. The M(n) and N(n) registers can only be updated from the ydb and xdb buses as shown in FIGS. 9 and 10 which displays only one update path. The R(n) register has four possible update sources as shown in FIGS. 7 and 8. Each multiplexer 65, 67, 69 and 71 of FIG. 7 has four inputs. Logic 201 of FIG. 11 controls the update as follows.

Under direction of the Program Decode Controller 25 (i.e. pdc_tcc_wr, pdc_reg_wr, pdc_tcc_wsel[2:0], pdc_update_rn[1:0], pdc_pre_arith[1:0] and pdc_rn_sel[3:0]) each update is uniquely decoded as follows.

Option 3 for R(n) file updates.

The signal pdc_waddr[5:0] can address each of the registers within the DSP 100, When pdc_waddr[5:0] address a base address Register (R(n)) within the AGU (i.e one of the R(n) register and the signal pdc_reg_wr is active then the signal rn_load[15:0] selects the path from either ydp or xdb as shown on FIGS. 7 and 8). The path through the multiplexer 61 through and gate 63 through one of the multiplexers 65, 67, 69 and 71 (controlled by rn_load [15:0]) is enabled to the latches 77, 75, 79 and 73.

M(n) and N(n) file updates. The above is also valid for updates to the M(n) and N(n) registers under the control of mn_load[7:0] and nn_load[7:0]. The M(n) and N(n) can only be updated via the xdb and ydb.

Option 2 for R(n) file updates.

The signal pdc_tcc_wsel[2:0] is capable of addressing one of the R(n) register for update when active with pdc_tcc_wr. The R(n) register is updated by the value from the transfer_rn[23:0] (this value is determined by multiplexor 241 on FIG. 12 under the control of pdc_tcc_rsel[2:0]). This allows the AGU to rotate the R(n) register independently of the xdb or ydb buses (internal update path). Depending on the selected value of pdc_tcc_wsel[2:0] then rn_load[15:0] selects the R(n) register to be updated by the transfer_rn[23:0] internal data path.

Option 1 for R(n) file updates.

The signal pdc_rn_sel[3:0] is used to decode one R(n) register from each of the sub R(n) files i.e. (R0–R3 and R4–R7).

pdc_rn_sel[1:0] select one of the R(n) register from the file R0–R3 pdc_rn_sel[3:2] select one of the R(n) register from the file R4–R7

Figure 15:
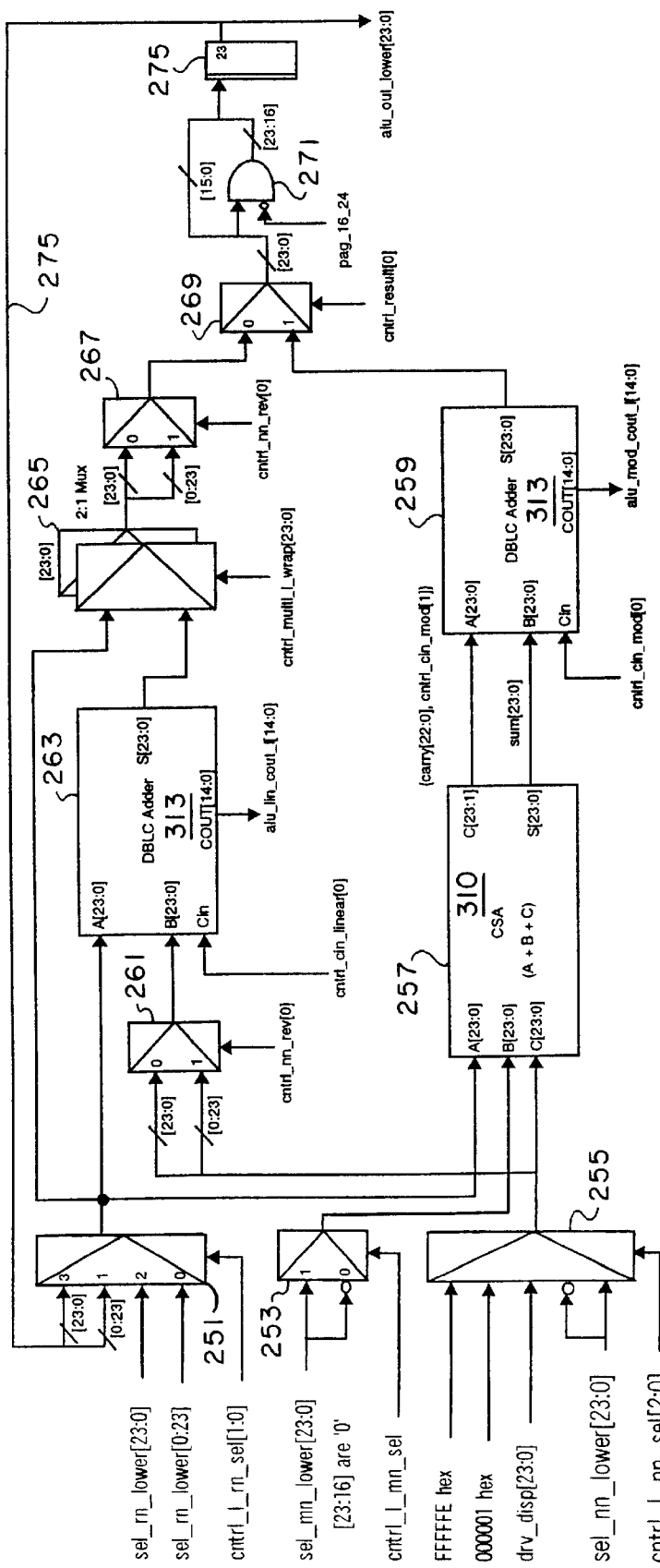
FIG. 15 is a schematic diagram of the lower_alu of FIG. 13.
Figure 16:
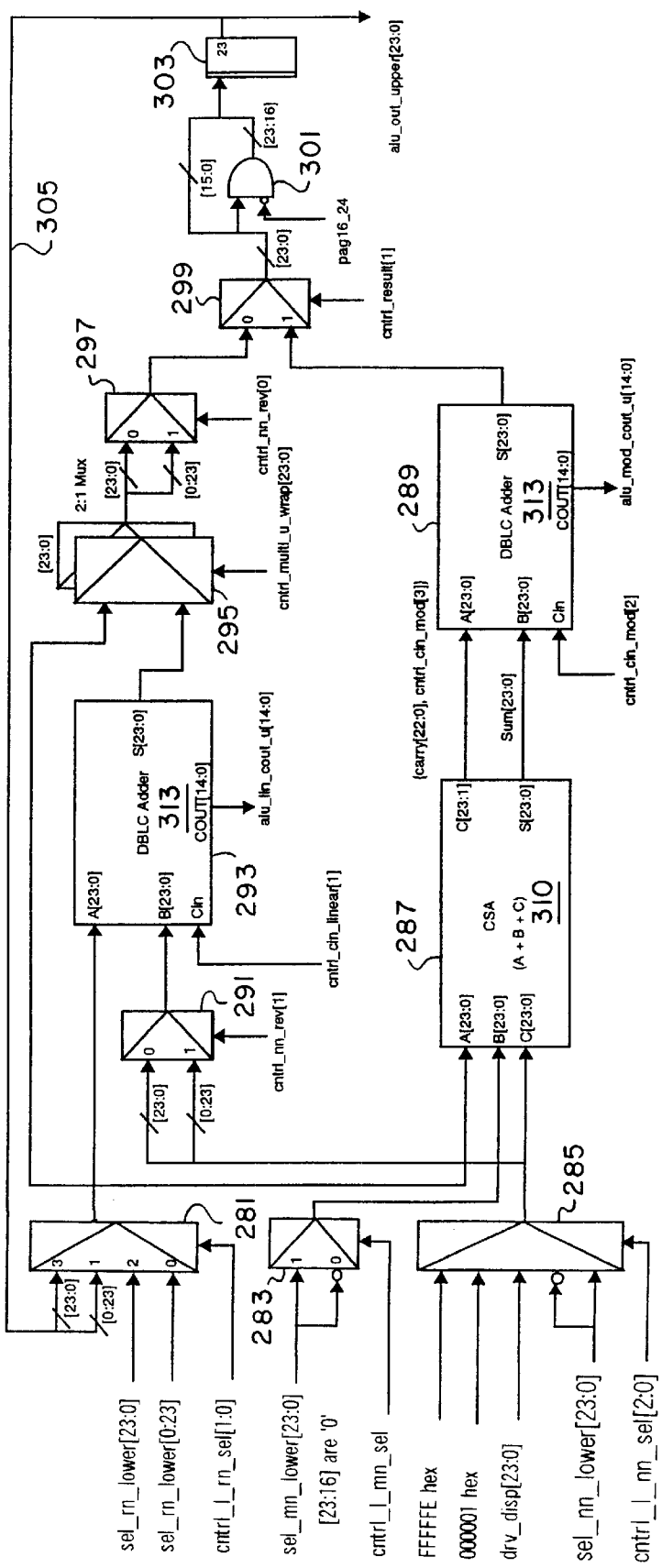
FIG. 16 is a schematic diagram of the upper_alu of FIG. 13.

The signal pdc_update_rn[1:0] (bit 0 is used in the lower ALU and bit 1 is used in the upper ALU) signifies if the selected R(n) register is to be updated by the values from alu_out_upper[23:0] (updates only R4–R7) and. alu_out_lower[23:0] (updates only R0–R3) from FIGS. 15 and 16.

Option 0 for R(n) file updates.

This is the default option if option 1, 2 and 3 above are inactive i.e the R(n) register is updated by itself. The signal sel_back_to_back[1:0] is active if the same R(n) register has been selected for updates in concurrent: cycles.

The signal sel_load_skip_load[1:0] is active only if the R(n) register has been selected in alternative cycles.

FIG. 12 is a schematic diagram of internal AGU transfer bus and external read circuit. It includes three input multiplexers 215, 217 and 219. Multiplexer 215 selects the contents of register R(n) under the control of pdc_raddr [2:0] and applies the selected register rn to multiplexer 221. Similarly, multiplexer 217 selects the contents of register nn and multiplexer 219 selects the contents of register mn also under the control of pdc_raddr [2:0] and applies the selection to multiplexer 221.

The selection of the output of multiplexer 221 is according to the conditions listed in balloon 223 and applied to AND gate 225 which checks for compatibility and passes the output to logic 227. Logic 227 will pass the output of multiplexer 221 and AND gate 225 to multitlexer 229.

Logic 227 works as follows. In the event of an update to an AGU register (controlled by pdc_waddr[5:0] and pdc_wr_reg) followed by a read of same AGU register (controlled by pdc_raddr[5:0]) or an update of any of the AGU register via the internal update path (controlled by pdc_tcc_rsel[2:0] and pdc_tcc_wr) followed by a read of the same AGU register (under the control pdc_tcc_rsel [2:0]) then it is necessary to allow xdb or ydb or the internal AGU data bus to update latch 231 rather than the outputs of multiplexors 215,217,219,221.

Multiplexer 229 either selects the output of logic 227 or drv_taddr (address bus driver from FIG. 24) under the control of pdc_agu_rd_sel and stores it in latch 231. The output of latch 231 is applied to line drivers 233 and 235.

Transfer_rn is the contents of a selected rn register from multiplexer 241 under the control of pdc_tcc_rsel [2:0] and the output of AND gate 243.

Figure 13:
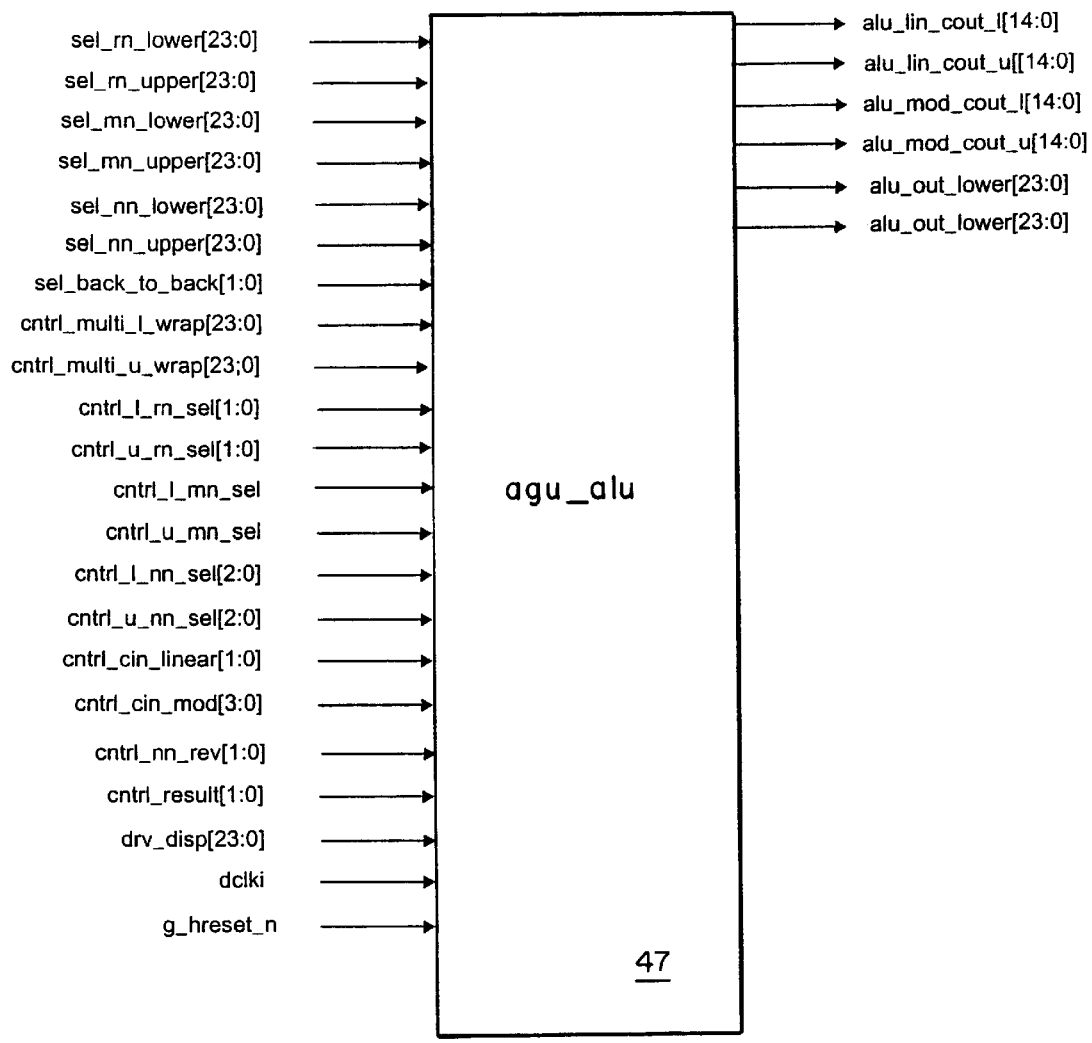
FIG. 13 is a is a block diagram of the agu_alu illustrating input and output signals.

FIG. 13 is a block representing the AGU ALU 47 and has the following inputs and outputs.

INPUTS sel_rn_lower[23:0] One of 4 possible R(n) inputs to the lower alu. Selection is dependent on the value of pdc_rn_sel[1:0].

sel_rn_upper[23:0] One of 4 possible R(n) inputs to the upper alu. Selection is dependent on the value of pdc_rn_sel[3:2].

sel_mn_lower[23:0] One of 4 possible M(n) inputs to the lower alu. Selection is dependent on the value pdc_mn_sel[1:0].

sel_mn_upper[23:0] One of 4 possible M(n) inputs to the upper alu. Selection is dependent on the value of pdc_mn sel[3:2].

sel_nn_lower[23:0] One of 4 possible Nn inputs tc the lower alu. Selection is dependent on the value pdc_nn_sel[1:0].

sel_nn_upper[23:0] One of 4 possible M(n) inputs to the upper alu. Selection is dependent on the value of pdc_nn_sel[3:2].

sel_back_to_back[1:0] Select the alu output as the alu input instead of an R(n) value. MSB for upper alu and LSP for lower alu. This is used in the case of a back to back arithmetic; operation on the same address register.

cntrl_multi_l_wrap[23:0] Selects between the lower linear adder output and the alu input during multi wrap modulo mode on a bit by bit basis.

cntrl_multi_u_wrap[23:0] Selects between the upper linear adder output and the alu input during multi wrap modulo on a bit by bit basis.

cntrl_u_rn_self[1:0] Lower alu base address input selection control. Determine the base address value inputted to the alu adders.

cntrl_u_rn_sel[1:0] Upper alu base address input selection control. Determine the base address value inputted to the alu adders.

cntrl_l_mn_sel Lower alu modulo input selection control. Determines whether the modulo value is supplied directly to the adder of a l'comp is performed in advance.

cntrl_u_mn_sel Upper alu modulo input selection control. Determines whether the modulo value is supplied direetly to the adder or a l'comp is performed in advance.

cntrl_l_nn_sel[2:0] Lower alu offget input selection control. Determine the N(n) value supplied to the adder.

cntrl_u_nn_sel[2:0] Upper alu Offset input selection control. Determine the N(n) value supplied to the adder.

cntrl_cin_linear[1:0] Determines the carries in of the linear adder. MSB is applied to upper alu and LSB to lower alu.

cntrl_cin_mod[3:0] Determines the carries into the modulo adder. MSB's are applied to upper alu and LSB's to lower alu.

cntrl_nn_rev[1:0] Determine if the offset (N(n)) input to the linear adder is reversed)

cntrl_result[1:0] Select between linear or modulo adder in modulo arithmetic mode.

pag_16_24 Sixteen bit compatibility mode. 1-bit from the PAG, bit thirteen of the status register.

0: 24 bit mode.

1: 16 bit mode.

drv_disp[23:0] 24-bit digplactment from pdc.

dclki Core clock 100 MHz programmable.

g_hreset_n Global core reset. Active low.

OUTPUTS alu_in_out_l[14:0] Carries from lower alu linear adder when modulo arithmetic is selected. These carries are used to determine adder selection.

alu_lin_cout_u[14:0] Carries from upper alu linear adder when modulo arithmetic is selected. These carries are used to determine adder selection.

alu_mod_cout_l[14:0] Carries from lower alu modulo adder when modulo arithmetic is selected. These carries are used to determine adder selection.

alu_mod_cout_u[14:0] Carries from upper alu when modulo arithmetic is selected. These carries are used to determine adder selection.

alu_out_lower[23:0] Lower alu output.

alu_out_lower[23:0] Upper alu output.

The ACV ALU 47 is responsible for address computation depending on the selected arithmetic. This block contains two ALUs which are mirror images of each other one operates on the lower file; and one operates on the upper file. For the purposes of description the discussion is limited to the lower ALU but the upper ALU operates the same. The ALU 47 can perform four types of arithmetic but only one at a given time as determined by the selected modifier register ("Address Modifier Encoding"). As previously discussed, there are two possible paths through the ALU 47 one for linear, multi-wrap around, modulo and reverse carry arithmetic and the other for modulo arithmetic.

In linear arithmetic the base address is either incremented or decremented by an offset. Reverse carry is similar to linear except that the base address and offset are bit reversed and the result is bit reversed.

Modulo arithmetic is performed as follows; the base address in R(n) is either incremented/decremented by an offset but the result must always stay within a defined range. In order to determine the address during modulo arithmetic operation both the linear and modulo paths perform the following operates as shown in FIG. 14 (l'M(n)=>l's complement of M(n) let N(n) stand for all possible modification to Rn). The carry from the selected bit determines which adder output to select.

Figure 19:
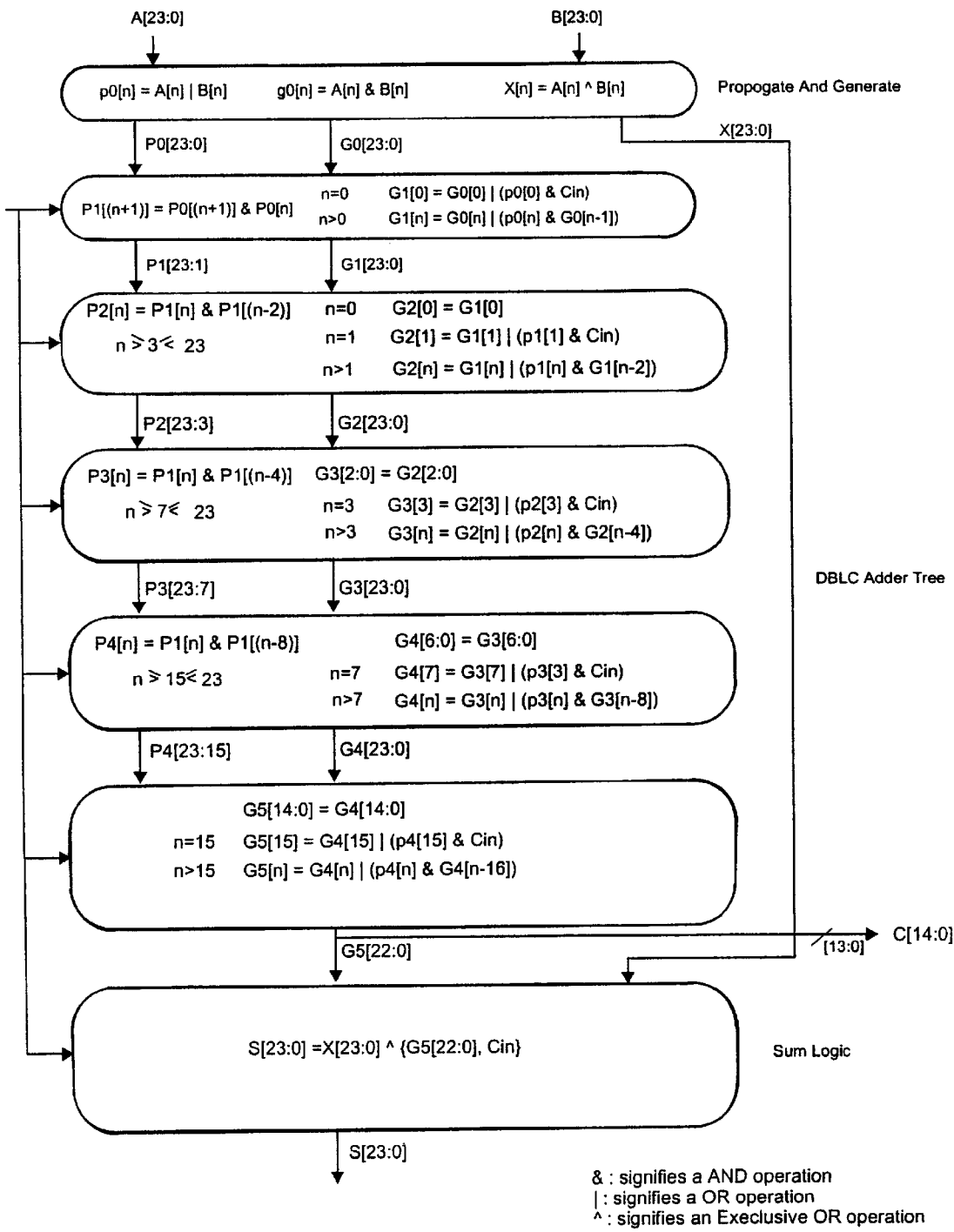
FIG. 19 is a is a flow diagram of the DBLC adder of FIGS. 15, 16 and 22.

The modulo arithmetic operation is outline in FIG. 14. The modulo adder is composed of a Carry Save Array (CSA) 310 followed by a Distributed Binary Look ahead Carry adder (DBLC) 313. The CSA 310 (FIGS. 17 and 19) is supplied with the selected R(n), N(n) (or l's comp N(n)) and M(n) (or l's ccmp M(n)) as inputs and produces a Sum and Carry output which is presented to the DBLC adder 313. A flow diagram of the DBLC adder is shown in FIG. 19. One of the requirements of the DBLC is that the carries be available as soon as possible as described in FIG. 14. Typically, the carry equations can be calculated using a parallel chains of and-or gates.

$$C_n = G_n + P_n @ C_{n-1} = G_n + P_n(G_{n-1} + P_{n-1} @ C_{n-2})$$
$$C_n = G_n + P_n(G_{n-1} + \ldots + P_2(G_1 + P_1 @ C_{in}))$$

where G means to generate and $P_n$ means to propagate. This results in a delay proportional to n which is unacceptable in this case (n=24). The DBLC takes advantage of a tree-structure.

The following are the main advantages of the DBLC: delay through adder grows with the $\log_2 n$ (24 bit adder $2^5$=>5 levels of logic); each stage present a maximum of two gates loads to the previous stage; regular topology for layout; and all carries are available with out extra logic If 16-bit compatibility is set the upper 8 bits of the ALU output are zeroed.

FIG. 15 is a schematic diagram of the lower ALU and includes one of four multiplexer 251 which selects either 0 to 23 bits from an output latch 273; bits 23 to 0 also from the output latch 273; sel_rn_lower [23:0] from the agu_sel 45; or sel_rn_lower [0:23]. The multiplexer 251 is controlled by cntrl_1_rn_sel which originates from the agu_alu_cntrl 51 of FIG. 20.

One of two multiplexer 253 selects either sel_mn_lower [23:0] or bits [23:16] of the same signal at an inverting input. Multiplexer 253 is controlled by cntrl_1_mn_sel.

Multiplexed 253 selects, as an output, either FFFFFF (hex), 000001 (hex), drv_disp which is a 24 bit; displacement from the Program Decode Controller 25, or the two sel_rn_lower [23:0] signals as was discussed in conjunction with multiplexer 251. Multiplexer 255 is controlled by cntrl_1_nn_sel [2:0].

The selected output5 of the multiplexers 251, 253 and 255 are applied to the A, B, and C inputs respectively of the CSA 257. The carry-out C and sum S of the CSA 257 are applied to the A and B inputs of the DBLC adder 259. The agu_alu_cntrl 51 provides cntrl_cin_mod to the carry-in input of C of the DBLC Adder 259. The sum output from the DBLC Adder 259 is applied to the one of two multiplexers 269 and the carry-out, C-out, is passed on as alu_mod_cout_l [14:0].

Multiplexer 261, under the control of cntrl_nn_rev [0] selects either the output from multiplexer 253 or the reversal of the bits of the output of multiplexer 253 and applies the selection to DBLC adder 263 at the B input.

The DBLC adder 263 sums the output of multiplexer 251 (A input) with h output mf multiplexer 261 plus the carry-in, Cin, which is provided by the agu_alu_cntrl 51.

The sum output S of the DBLC adder 263 is applied to parallel multiplexer 265 and the carry-out, Cout, is provided as alu_lin_cout_l [14:0].

Parallel multiplexer 265 is under the control of cntrl_multi_l_wrap [23:0] and selects either the output. from multiplexer 251 or the summation from DBLC adder 263 and applies it to a reversing multiplexer 267.

Multiplexer 267, under the control of cntrl_nn_rev selects either the output of parallel multiplexer 265 or the reversal of the bits of the output of parallel multiplexer 265 and applies the selection to multiplexer 269.

Cntrl_result [0] causes the multiplexer 269 to select either the summation from DBLC adder 259 or the output of multiplexer 269. Bits [23:16] of the selection is applied to the AND gate 271. The output of AND gate 271 and bits [15:0] are applied to latch 272.

The circuitry for the upper_alu is the same as the lower_alu and is illustrated in FIG. 16 to which reference should now be made. Because of the similarity, only the difference will be discussed, Multiplexer 281 operates under the control of cntrl_u_rn_sel [1:0] and selects either the output of latch 303, or the reversal of bits from latch 303, sel_rn_upper [23:0], or sel_rn_upper [0:23]. Multiplexer 283 is controlled by cntrl_u_mn_sel and selects either sel_mn_upper [23:0] or bits [23:16]. Multiplexer 285 has similar inputs as multiplexer 253 except for sel_nn_upper [23:0] and the inverted input thereof. It is under the control of cntrl_u_nn_sel [2:0]. The carry-in for DBLC adder 289 is cntrl_cin_mod [2]. Multiplexer 291 is controlled by cntrl_nn_rev [1]. The carry-in, Cin, for DBLC adder 293 is cntrl_cin_linear[1] and the Cout, is alu_lin_cout_u [14:0]. Parallel multiplexer 295 is controlled by cntrl_multi_u_wrap [23:0], whereas multiplexer 299 is controlled by cntrl_result [1]. The output of latch 305 is applied to feedback bus 303 and is designated as alu_out_upper [23:0].

Figure 17:
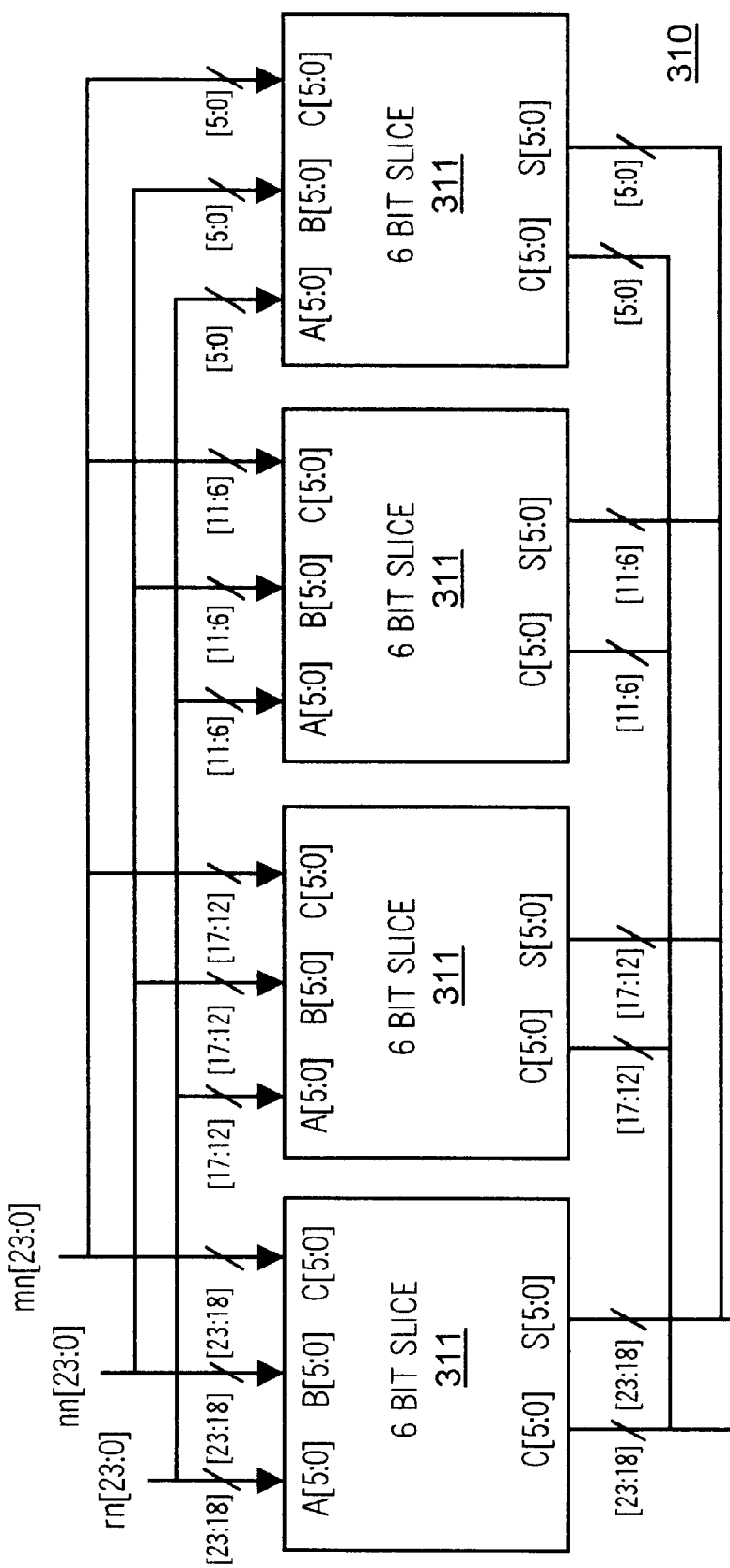
FIG. 17 is a schematic diagram of the CSA for FIGS. 15 and 16.

The CSA 310 of FIGS. 15 and 16 is illustrated in FIG. 17 and includes four 6-bit slices 371 for a total of 24 bits. Each 6-bit slice receives R(n) input to the A input, a N(n) input to the b input and M(n) input to the carry inputs. The A and B input data are summed and the carry input modifies the summation.

Figure 18:
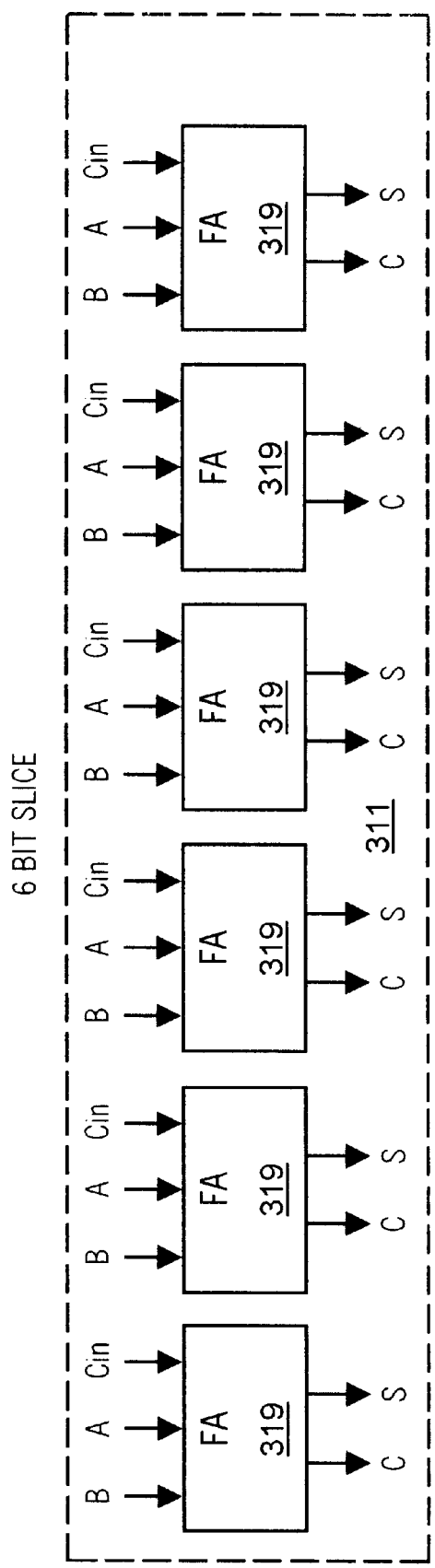
FIG. 18 is a block diagram of the 6-bit slice of the CSA of FIG. 17.

FIG. 18 is a diagram of the 6-bit slice and includes six Full Adders (FA) 319.

FIG. 19, to which reference should now be made, there is a flow diagram of the operation of the DBLC adder 313. As recalled, the adders has an A input, a B input, a carry-in input, and a cout and S outputs. In the embodiment shown, there are 24 bits to a word and the two 24 bit signals are applies to block 400. There the propagation is determined by logically ORing the A[n] and B[n] inputs. The generation is determined by taking the AND combination of An and Bn and Xn is determined by obtaining the exclusive OR of A[n] and B[n]. In the flow diagram, the sign of "&" represents "AND" and the "^" represents "exclusive OR" and "|" represents "OR". After P, G and X have been determined, the P and G output of block 400 is applied to block 402. In block 402, P1 and G1 are determined it, combination with Cin. The output of stage 402 is applied to stage 404 where P2 and G2 in combination with Cin are determined and applied to stage 404. Block 406 is connected to block 404 and receives a P2 inputs and G2 where the P3 and G3 inputs are generated in combination with Cin. Following the generation of P3 and G3, they are applied to block 408 where P4 and G4 in combination with Gin are generated according to the equations contained in block 408. The output of block 408 is 16 is applied to block 410 where G5 is generated. The output of the Cout is the first 15 bits, 0 through 14, of the output of block 410, the summation is determined in block: 412.

Figure 20:
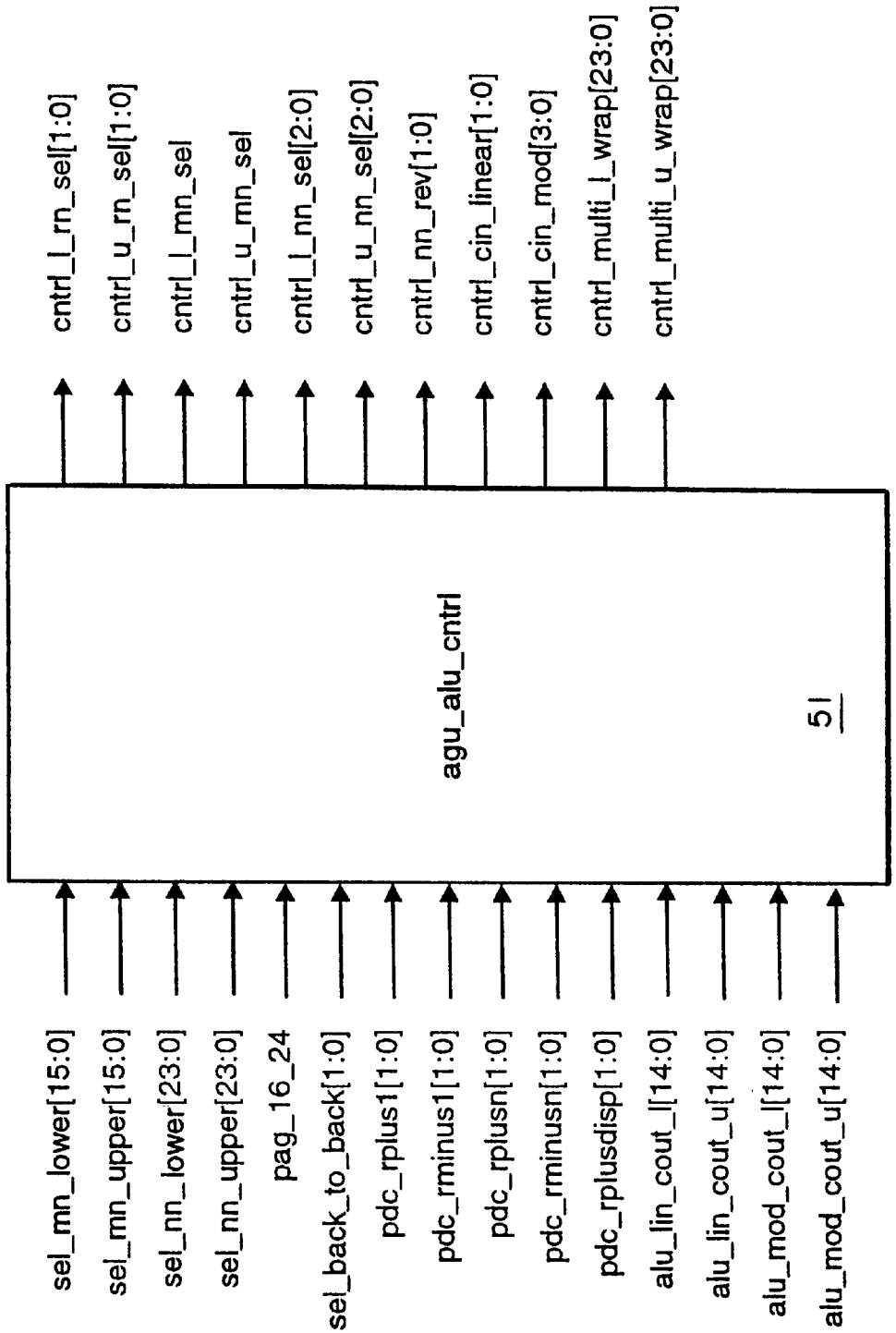
FIG. 20 is a block diagram of the agu_alu_cntrl of FIG. 5 illustrating the input and output signals.

FIG. 20 is a block diagram of the agu_alu_cntrl of FIG. 5 illustrating the input and output signals has the following input and output signals.

INPUTS sel_mn_lower[23:0] One of four possible M(n) inputs to the lower alu. Selection is dependent on the value pdc_mn_sel[1:0].

ssel_mn_upper[23:0] One of four possible M(n) inputs to the upper alu. Selection is dependent on the value pdc_mn_sel[3:2].

sel_nn_lower[23:0] One of four possible N(n) inputs to the lower alu. Selection is dependent on the value pdc_nn_sel [1:0].

sel_nn_upper[23:0] One of four possible M(n) inputs to the upper alu. Selection is dependent on the value pdc_nn_sel[3:2].

pag_16_24 Sixteen bit compatibility mode. 1-bit from the PAG, bit thirteen of the status register.
0: 24 bit mode
1: 16 bit mode sel_back_to_back[1:0] Select the alu output as the alu input instead of an R(n) value. MSB for upper alu and LSB for lower alu. This is used in the case of a back to back arithmetic operation on the same address register.

pdc_rplus[1:0] Increment the R(n) registers by 1. 2-bit control from PDC. LSB controls lower alu and MSB controls upper alu. This signal is provided to the AGU in cycle 3 and is registered in the AGU on the rising edge of cycle 4.

pdc_rminus[1:0] Decrement the R(n) registers by 1. 2-bit control from PDC. LSB controls the lower alu and MSB controls upper alu. This signal is provided to the AGU in cycle 3 and is registered in the AGU on the rising edge of cycle 4.

pdc_rplusn[1:0] Increment the R(n) registers by the respective N(n) register. LSB controls lower alu and MSB controls upper alu. This signal is provided to the AGU in cycle 3 and is registered in the AGU on the rising edge of cycle 4.

pdc_rminusn[1:0] Decrement the R(n) registers by the respective N(n) register. LSB controls the lower alu and MSB controls upper alu. This signal is provided to the AGU in cycle 3 and is registered in the AGU on the rising edge of cycle 4.

pdc_rplus_disp[1:0] Contents of the R(n) register is added to a 24-bit displacement to produce an address. 2-bit control from PDC. LSB specifies that the displacement is to be added to one of R0–R3, MSB specifies R4–R7. This signal is provided to the AGU in cycle 3 and is registered in the AGU on rising edge of cycle 4.

alu_lin_cout_l[14:0] Carries from lower alu linear adder when modulo arithmetic is selected. These carries are used to determine adder selection.

alu_lin_cout_u[14:0] Carries from upper alu linear adder when modulo arithmetic is selected. These carries are used to determine adder selection.

alu_mod_cout_l[14:0] Carries from lower alu modulo adder when modulo arithmetic is selected. These carries are used to determine adder selection.

alu_mod_cout_u[14:0] Carries from upper alu modulo adder when modulo arithmetic is selected. These carries are used to determine adder selection.

OUTPUTS cntrl_l_rn_sel[1:0] Lower alu base address input selection control. Determine the base address value inputted to the alu adders.

cntrl_u_rn_sel[1:0] Upper alu base address input selection control. Determine the base address value inputted to the alu adders.

cntrl_l_mn_sel Lower alu modulo input selection control. Determines whether the modulc value is supplied directly to the adder or a l'comp is performed in advance.

cntrl_u_mn_sel Upper alu modulo input selection control. Determines whether the modulo value is supplied directly to the adder or a l'comp is performed in advance.

cntrl_l_nn_sel[2:0] Lower alu offset input selection contol. Determine the N(n) value supplied to the adder.

cntrl_u_nn_sel[2:0] Upper alu offset input selection control. Determine the N(n) value supplied to the adder.

cntrl_cin_linear[1:0] Determines the carry in of the linear adder. MSB is applied to upper alu and LSB to lower alu.

cntrl_cin_mod[3:0] Determines the carries into the modulo adder. MSB's are applied to upper alu and LSB's to lower alu.

cntrl_multi_l_wrap[23:0] Selects between the lower linear adder output and the alu input during multi wrap modulo on a bit by bit basis.

cntrl_multi_u_wrap[23:0] Selects between the upper linear adder output and the alu input during multi wrap modulo mode on a bit by bit basis.

cntrl_nn_rev[1:0] Determine if the offset (N(n)) input to the linear adder is reversed.

The operation of agu_alu_cntrl can be better understood by referring to FIG. 15, to determine the input that is selected for multiplexer 269 of FIG. 15 the following process is observed. If M(n) in FIG. 4 selects either the Reverse Carry option or the Linear option or the ?1 Multi Wrap-Around options then the input '0' of multiplexer. 269 is always selected. IF M(n) in FIG. 4 select one of a number modulo options (i.e. modulo 2 to Modulo $2^{15}$), then the following procedure must be observed, The COUT[14:0] of DBLC adder 263 in FIG. 15 and COUT[14:0] of DBLC adder 259 are used to determine the selection of inputs to multiplexer 269. The following process occurs in agu_alu_cntrl 51 of FIG. 5.

The following is a description of this selection.

Depending on the Value of M(n) one bit of COUT is selected from DBLC adders 259 and 263.

Please note that 'x' below represents a don't care i.e. the value can be 0 or 1.

If

M(n)[14:0]=000000000000001 then select COUT[0] from both DBLC adder 263 and 259

M(n)[14:0]=000000000001x then select COUT[1] from both DBLC adder 263 and 259

M(n)[14:0]=0000000000001xx then select COUT[2] from both DBLC adder 263 and 259

M(n)[14:0]=000000000001xxx then select COUT[3] from both DBLC adder 263 and 259

M(n)[14:0]=00000000001xxxx then select COUT[4] from both DELC adder 263 and 259

M(n)14:0]=00000000001xxxxx then select COUT[5] from both DBLC adder 263 and 259

M(n)[14:0]=000000001xxxxxx then select COUT[6] from both DBLC adder 263 and 259

M(n)[14:0]=00000001xxxxxxx then select COUT[7] from both DBLC adder 263 and 259

M(n)14:0]=0000001xxxxxxxx then select COUT[8] from both DBLC adder 263 and 259

M(n)[14:0]=000001xxxxxxxxx then select COUT[9] from both DBLC adder 263 and 259

M(n)[14:0]=00001xxxxxxxxxx then select COUT[10] from both BDLC adder 263 and 259

M(n)[14:0]0001xxxxxxxxxxx then select COUT[11] from both DBL)C adder 263 and 259

M(n)[14:0]=001xxxxxxxxxxxx then select cOUT[12] from both DBLC adder 263 and 259

M(n)[14:0]=01xxxxxxxxxxxxx then select COUT[13] from both DBLC adder 263 and 259

M(n)[14:0]=1xxxxxxxxxxxxxx then select COUT[14] from both DBLC adder 26 and 25

Using FIG. 14 and the selected Carry bits as described above, the appropriate input to multiplexer 269 is selected.

Please note that the linear option in this table corresponds to input '0' of multiplexer 269 and input '1' corresponds to Modulo adder.

One final point is the determination of the Cin to DBLC adder 263 and 259 on FIG. 15.

To determine whether Cin on DBLC adder 263 is a logical 1 or a logical 0, one must refer to FIG. 14. As item 263 is considered in the linear adder path please refer to column 1 in the table "Linear Adder". If a "+1" is present, then the Cin is assumed a logical 1, otherwise it is assumed a logical 0. In order to determine the Cin of DBLC adder 259 which is located in the modulo adder path of the ALU, please refer to Column 2 "Modulo Adder" of FIG. 14. If a "+1" is present then the Cin of item 259 is a logical 1 otherwise the Cin is a logical zero.

Figure 21:
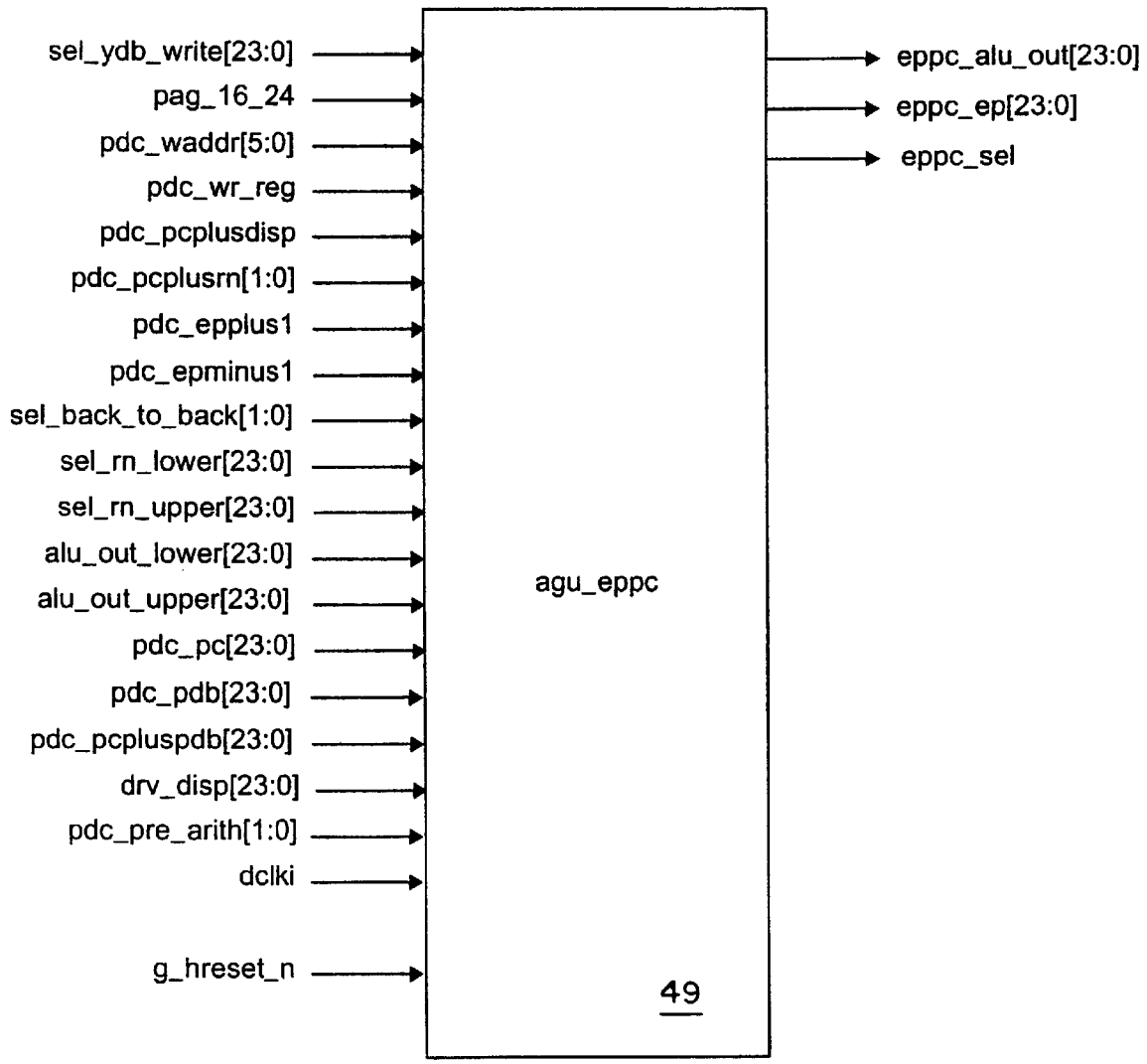
FIG. 21 is a is a block diagram of the agu_eppc of FIG. 5 illustrating the input and output signals.

FIG. 21 is a block diagram of the agu_eppc and it provides the following functions: extension pointer plus one (linear arithmetic); extension point minus one (linear arithmetic); program counter plug a shortflong diaplagement (linear arithmetic); program counter plus a address register (linear arithmetic).

INPUTS sel_ydb_write[23:0] Either the xdb or ydb depending on pdc_sel ydb.

pag_16_24 Sixteen bit compatibility mode. 1-bit from the PAG, bit thirteen of the status register.
0: 24 bit mode
1: 16 bit mode pdc_waddr[5:0] Selects one of the internal core registers. 6-bits from PDC. The value present on ydb or xdb is transferred to the selected register at the end of cycle 6 provided the pdc_wr_reg is valid.
010RRR=> Selects one of the R(n) registers.
011NNN=> Selects one of the N(n) Registers
100MMM=> Selects one of the M(n) registers
101010=> Selects EP register pdc_wr_reg Core register write enable. Active High. This is used in conjunction with the pdc_waddr [5:0] to select a destination register for a write address.

pdc_pcplusdisp The program counter is incremented by pdc_disp[23;0]. 1-bit control from PDC. The resultant value can be driven onto the pab. This signal is provided to the AGU in cycle 4 and is a register input to the AGU.

pdc_pcplusrn[1:0] Add the program counter to the R(n) register. 1-bit control from PDC. The R(n) register is not updated. The resultant value can be driven onto the pab. The signal is provided to the AGU in cycle 4 and is a register input to the AGU. MSB select upper file and LSB select lower file. Active high pdc_epplusl Increment Extension Pointer (EP) by one. 1-bit control from PDC. EP is increment by one and updated. This signal is provided to the AGU in cycle 4 and is a register input to the AGU.

pdc_epminusl Decrement extension pointer by one. 1-bit control from PDC. EP is decremented by one and updated. This signal is provided to the AGU in cycle 4 and is a register input to the AGU.

pdc_pcpluspdb Add the program counter to the value on pdc_pdb[23:0]. This signal is provided to the AGU in cycle 4 and is a register input to the AGU.

sel_back_to_backf[1:0] Select the alu output as the alu input of an R(n) value. MSB for upper alu and LSB for lower alu. This is used in the case of a back to back arithmetic operation on the same address register.

sel_rn_lower[23:0] One of four possible R(n) inputs to the lower alu. Selection is dependent on the value of pdc_rn_sel[1:0].

sel_rn_upper[23:0] One of four possible R(n) inputs to the upper alu. Selection is dependent on the value pdc_rn_sel[3:2].

alu_out_lower[23:0] Lower alu output.

alu_out_upper[23:0] Upper alu output.

pdc_pc[23:0] Program counter. 24 bit value from PDC. signifies the address of the last instruction pre-fetch.

pdc_pdb[23:0] Program data bus register from the PDC.

drv_disp[23:0] 24-bit displacement from pdc.

pdc_pre_arith[1:0] Signifies that the current arithmetic operation in the AGU is a pre-arithmetic operation. MSE upper alu and LSB lower alu. Active during a (R(n)), (R (n)+N (n)) (PC+displ) and (PC+R(n)) operation.

dclki Core clock.

g_hreset_n Global core reset. Active low.

OUTPUTS eppc_alu_out[232.0] Extension pointer or program counter alu output depending on the operation requested.

eppc_ep[23:0] Extension pointer register output.

eppc_sel Output drive mux selection. On a back to back update of the Extension pointer the alu output is selected rather than the Extension pointer register. In the case of a PC operation, the alu output is always selected.

Figure 22:
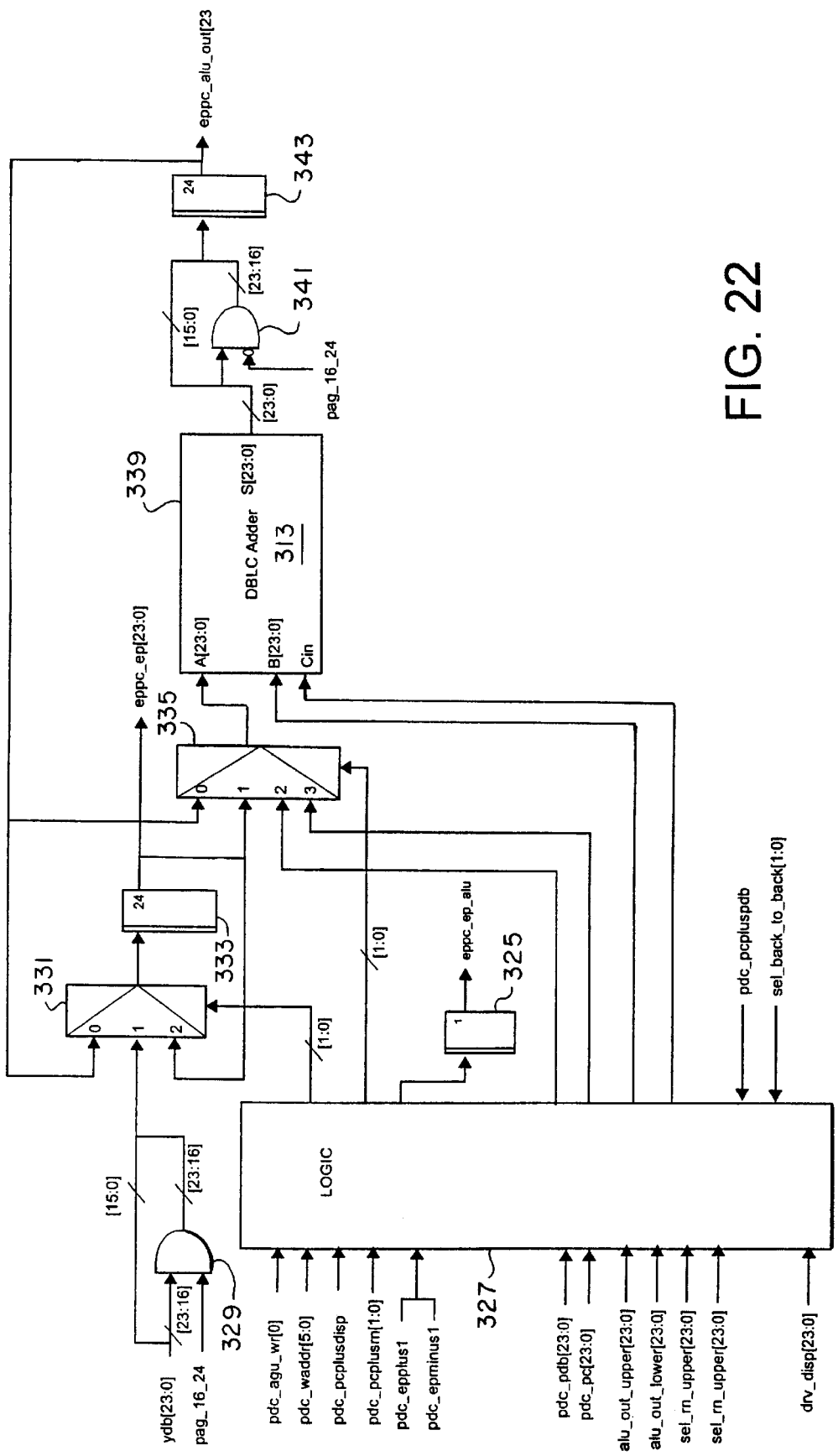
FIG. 22 is a schematic diagram of the extension pointer and program counter alu of FIG. 21.

FIG. 22 is a schematic diagram of the extensior. pointer and program counter ALU. Multiplexer 331 selects either the output of latch 343, the y data bus ydb, the AND combination from AND gate 329 of the ydb, pag_16_24, or the output from logic 327 which is also the select signal.

The logic block 327 is responsible for controlling updates to the Extension Pointer Latch 331 and as a multiplexer for deciding which address bus will be inputed to the RDBLC addr 313 . The are three possible option for updates to the Extension Pointer Latch 331:

Option 1. A update via the ydb data bus. If pdc_waddr [5:0] addresses the Extension Pointer latch 331 and pdc_agu_wr[0] is asseted then the Extension Pointer latch 331 will be updated via input 1 of multiplexor 331.

Option 0. The Extension Pointer can be updated from the output of the latch 343 under the control of the following signals when asserted (pdc_pcplusdisp, pdc_pcplusrn[1:0], pdc_epplusl and pdc_epminusl).

Option 2. If option 0 and option 2 are inactive then by default, the latch 331 is updated by itself.

As a multiplexor. Depending on the values of pdc_plusrn [1:0], pdc_pcplusrn[1:0], pdc_pcpluspdb, sel_back_to_back[1:0], pdc_eplusl, pdc_epminusl and pdc_pcplusdisp one of the following address options is inputted to the RDBLC adder 313 (inputs A and B) alu_out_lower[23:0], alu_out_upper[23:0], sel_rn_upper[23:0], sel_rn_lower [23:0], drv_disp[23:0], pdc_pdb, pdc_pc or eppc_ep.

The Cin to the RDBLC is also determined by pdc_plusrn [1:0] and pdc_pcplusrn[1:0] and pdc_pcpluspdb or sel_back_to_back[1:0] pdc_eplusl, pdc epminusl and pdc_pcplusdisp.

Logic 327 combines pdc_agu_wr[0], pdc_waddr[5:0], pdc_pcplusdisp, pdc_pcplusrn[1:0], pdc_epplus, and pdc_epminusl plus the delay of the last two signals which are delayed one clock cycle by latch 323 to provide the control signals to multiplexer 331 and 335 as well as to latch 325 which provides, as an output, eppc_ep_alu.

The output of multiplexer 331 is applied to latch 333 which provides as an output eppc_ep[23:0].

The outputs of latches 333 and 43 are applied to the inputs of multiplexer 335 which also receives as inputs, pdc_pdb [23:0] and applies the selection to the A input of the OBLC adder 339. The B and C inputs are provided by logic 329.

The S output of DBLC adder 339 is applied to latch 343 and AND gate 341 which output is also applied to latch 343 which output is eppc_alu_out [23:0].

Figure 23:
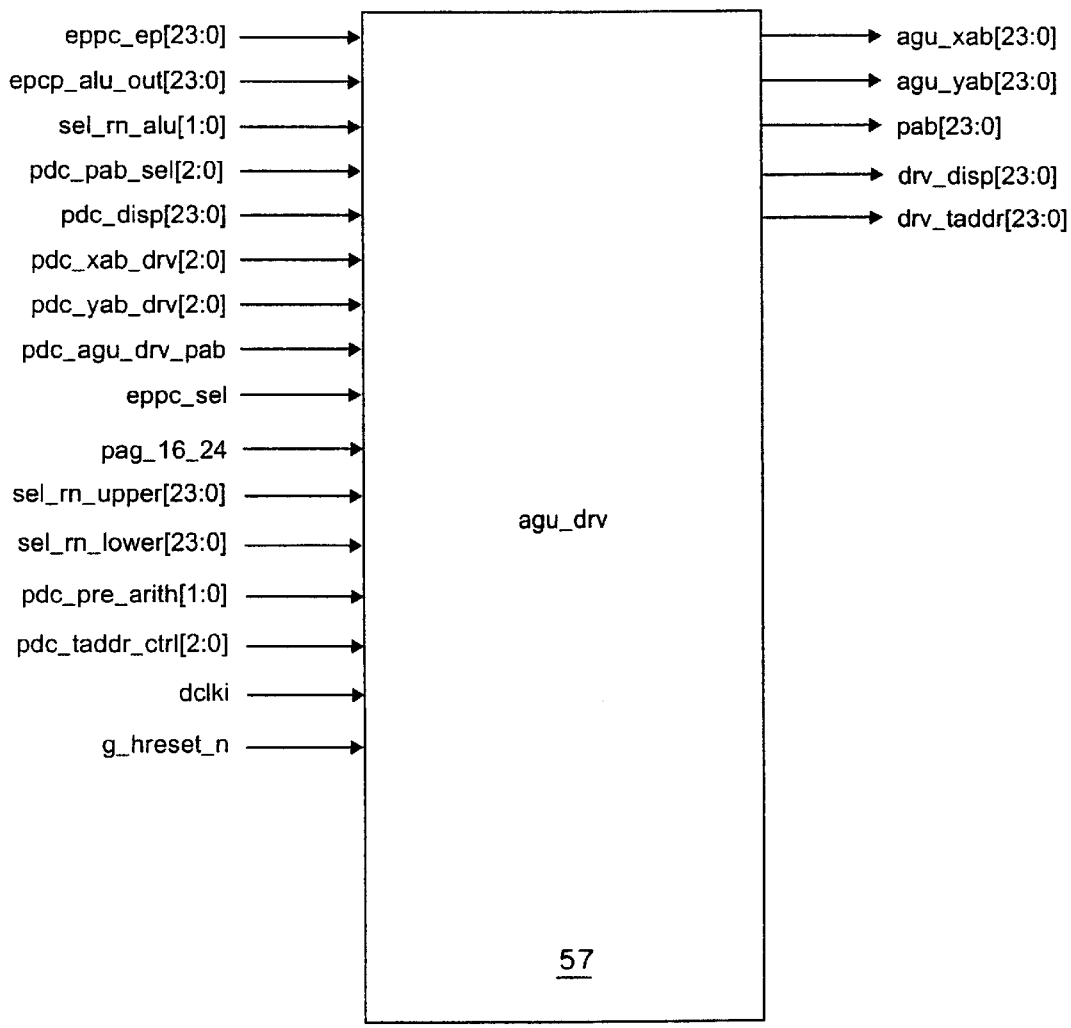
FIG. 23 is a schematic diagram of the agu_drv of FIG. 5 illustrating the input and output circuits.

FIG. 23 is a block diagram of agu_drv 57 which is the driver circuit for the AGU. FIG. 23 is the address bus selection agu_drv 57 which provides the following: selects address driver for XAB from one of four sources; selects address driver for YAD from one of four sources; and selects address driver for PAB from one of eight sources.

There are four possible sources of address for the agu_xab and agu_yab buses, Lower ALU of FIG. 15, Upper ALU of FIG. 16, EF/PC AGU 200 or a PDC 5 supplied address. The PAB has eight possible sources which are used to supply an address in cycle four or five.

INPUTS eppc_ep[23:0] Extension Pointer. Points to the next, available location in memory.

eppc_alu_out[232:0] Extension pointer or program counter alu depending on the operation requested.

sel_rn_alu[1:0] Alu output selection for bus driver. Select between the R(n) register file and the alu output. IN the case of a pre arithmetic operation, the alu output is always selected. In the case of a post arithmetic operation, the R(n) register file or the alu output may be the source address for the bus driver.

pdc_pab_sel[2:0] Determines the source of the address to be drive onto the PAB in either cycle 4/5. 3-bit select from PDC. Registered from PDC.
000/100/111: Temporary Register
001: Displacement
010: Displacement
011: Extension Pointer ALU
101: Lower R(n) ALU
110: Upper R(n) ALU pdc_disp[23:0] Displacement value. 24-bit value from PDC. Provides the displacement in PC relative modes and is used as an address in special address modes which can be driven onto one of the address buses.

pdc_xab_drv[2:0] Select address source for X memory address bus. 3-bit select from PDC. Active in cycle 4. Unregistered from PDC.
000/100: Hold Previous Value
001/010: Displacement
011: Extension Pointer
101: Lower R(n) ALU
110: Upper R(n) ALU
111: Temporary Register pdc_yab_drv[2:0] Select address source for Y memory address bus yab. 3-bit select from PDC 25. Active in cycle 4. Unregistered from PDC.
000/100: Hold previous value
001/010: Displacement
011: Extension Pointer
101: Lower R(n) ALU
110: Upper R(n) ALU
111: Temporary Register pdc_agu_drv_pab[2:0] Enables AGU 200 to drive the pab bus. 1-bit from the PDC 25.
1: AGU drives pab
0: IGU drives HI-Z eppc_sel Output driver mux selection. On a back to back update for the Extension pointer the alu output is selected rather than the Extension pointer register. In the case of a PC operation, the alu output is always selected.

pag_16_24 Sixteen bit compatibility mode. 1-bit from the PAG, bit thirteen of the status register.
10: 24 bit mode.
1: 16 bit mode.

sel_rn_lower[23:0] One of four possible R(n) inputs to the lower alu. Selection is dependent on the value pdc_rn_sel[1:0].

sel_rn_upper[23:0] One of four possible inputs to the upper alu. Selection is dependent on the value pdc_rn sel[3:2].

pdc_pre_arith[1:0] Signifies that the current arithmetic operation in the AGU 200 is a pre arithmetic operation. MSB upper alu and LSB lower alu. Active during a −(R(n)), (R(n)+N(n)) (PC+displ) and (PC+R(n)) operation.

pdc_taddr_ctr[2:0] Selects source for temporary register.
000: Hold previous value 001/010: Displacement
011: Extension
101: Lower ALU file
110: Upper ALU file dclki Core clock.

g_hreset_n Global core reset. Active low.

OUTPUTS agu_xab[23;0] X data memory 7 address. 24-bit address from AGU 200.

agu_yab[23:0] Y data memory 9 Address. 24-bit address from AGU 200.

pab[23:0] Program address bus (PAB). 24-bit address from AGU 200.

drv_disp[23:0] 24-bit displacement from pdc.

drv_taddr[23:0] 24-bit address from lower/upper ALU or from lower R(n) files. May be driven onto the ydb or xdb during LUA, instruction.

Figure 24A:
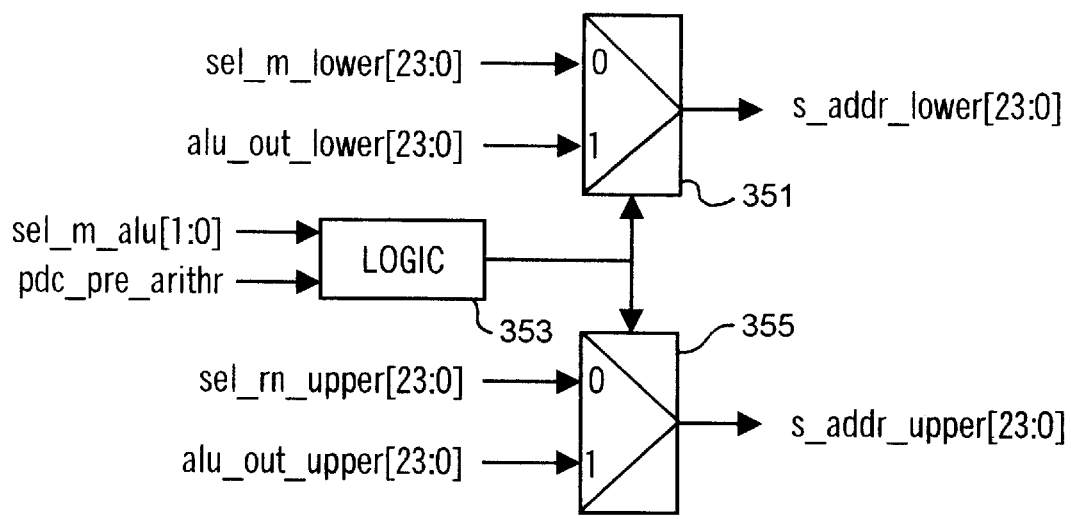
FIGS. 24 are schematic diagrams of the agu_drive of FIG. 23.

FIGS. 24 are the address bus driver selection and FIG. 24a provides s_addr_lower from the selection of sel_rn_lower or alu_out_lower by the multiplexer 351 under the control of logic 353. Similarly, s_addr_upper is from the selection of sel_rn_upper or alu_out_upper by multiplexer 355 under the control of the output of logic 353. Logic 353 combines sel_rn_alu with the pdc_pre_arithr to generate the control signals for multiplexers 351 and 355.

Figure 24B:
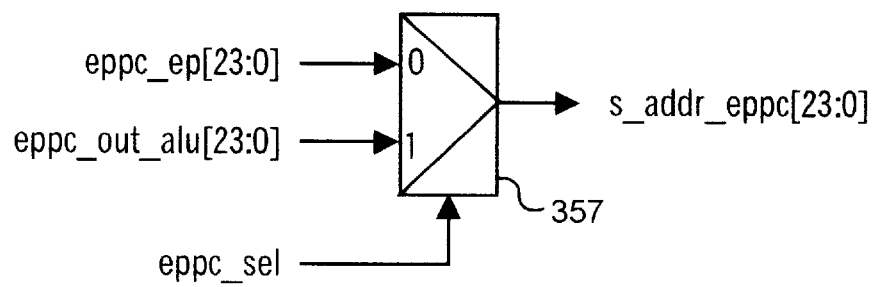

In FIG. 24b, multiplexer 357 provides, as an output, s_addr_oppr [23:0] from either eppc_ep [23:0] or eppc_out_alu [23:6]as determined by the logic sate of eppc_sel.

Figure 24C:
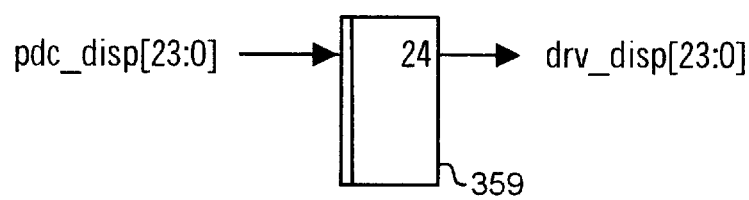

Latch 359, in FIG. 24c, converts pdg_disp to drv_disp.

Figure 24D:
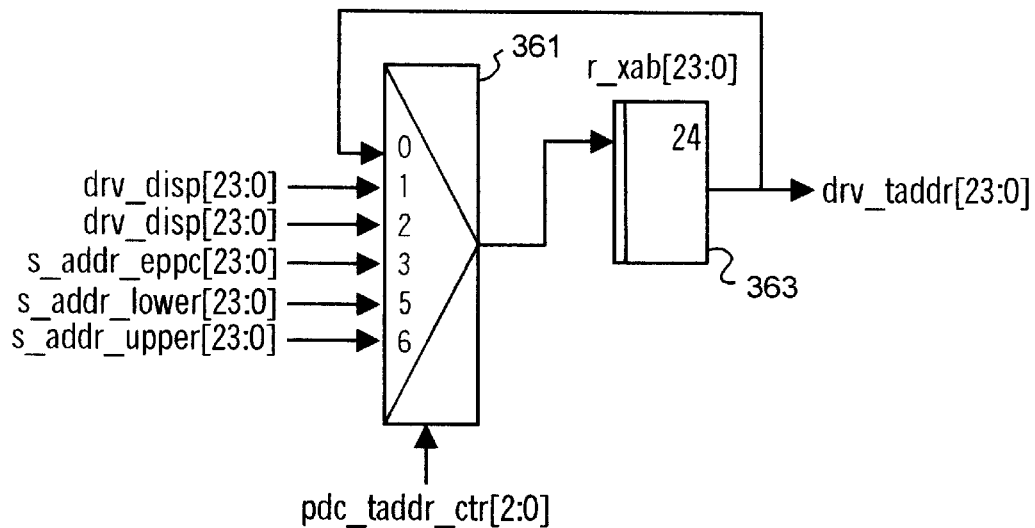

Drv_tdaddr [23:0] is generated in FIG. 24d by multiplexer 361 and latch 363. Multiplexer 361, under the control of pdc_taddr_ctr [2:0], selects either the output of latch 363, drv_disp, s_addr_eppc, s_addr_lower or s_addr_upper as an output. The output of the multiplexer 361 is stored in latch 363 as drv_daddr.

Figure 24E:
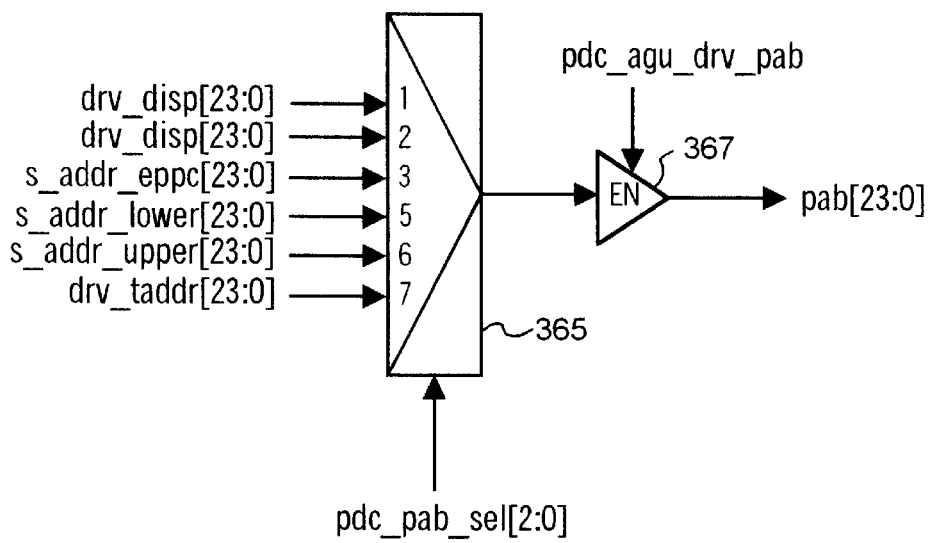
Figure 24F:
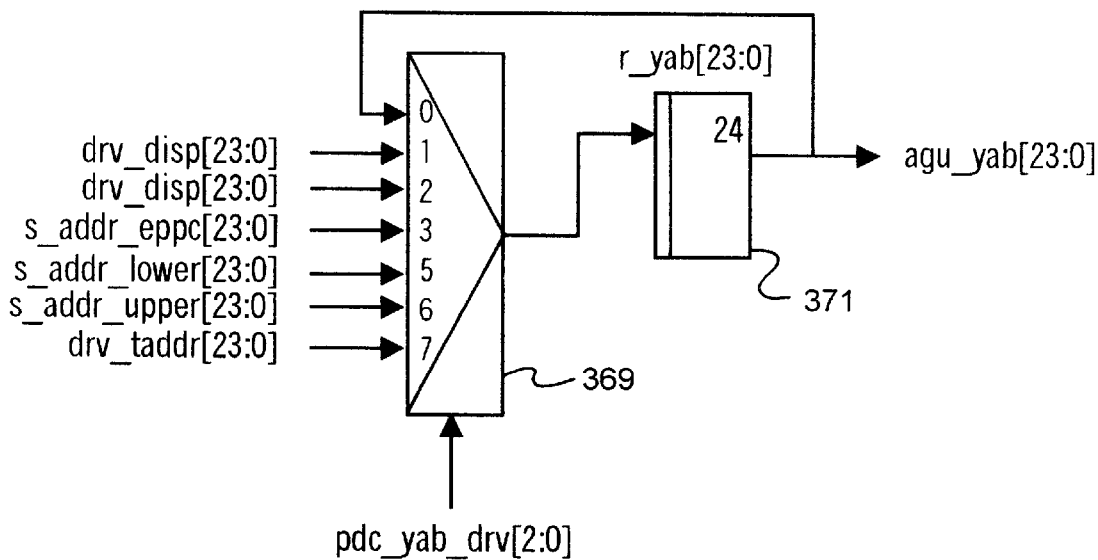

In FIG. 24e, pab is generated and driven by line driver 367. Line driver 367 is enabled by pdc_agu_drv_pab and receives the output of multiplexer 365. Multiplexer 365 selects either drv_disp, s_addr_eppc, s_addr_lower, s_addr_upper or drv_taddr under the control of padc_pab_sel[2:0].

The agu_yab [23:0] are the outputs of latch 371 which, stores the output r_yab [23:0] of multiplexer 369. Multiplexer 369 selects under the control of pdc_yab_drv [2:0] either drv_disp, s_addr_eppc, s_addr_lower, s_addr_upper or drv_taddr. The selected and stored 24-bits become agu_yab [23:0].

Figure 24G:
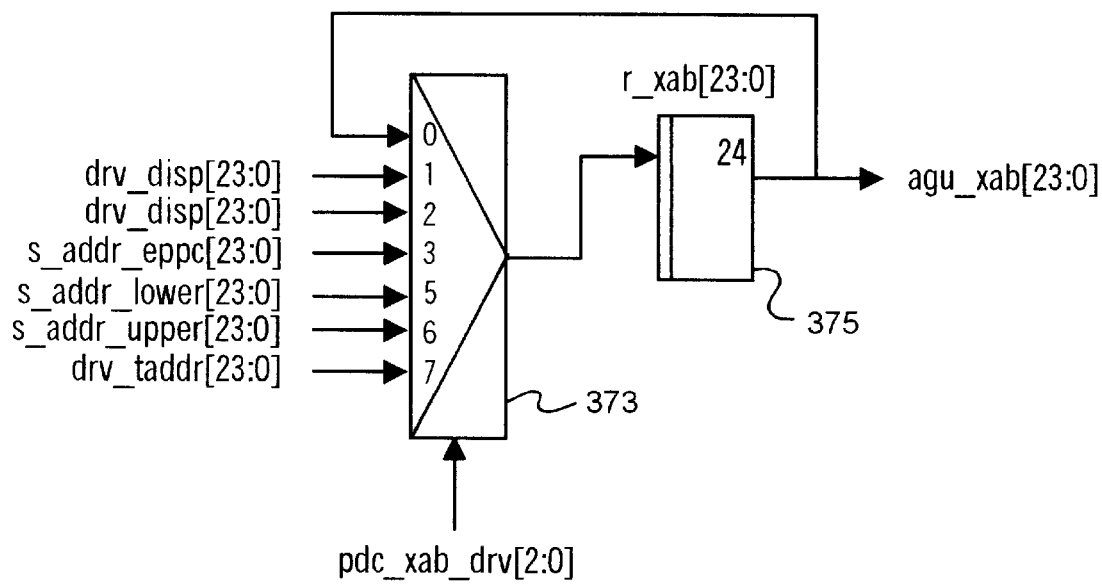

FIG. 24g includes a multiplexer 373 and a latch 375 which output is agu_xab [23:0]. The multiplexer 373 has the same inputs as multiplexer 369 of FIG. 24f and as an output r_yab [23:0] but the control input which is pdc_xab_drv [2:0]. The circuit operates in the same was as the circuit in FIG. 24f.

The invention having been described, what is claimed is:

1. An Address Generation Unit (AGU) for a processor having a data memory addressable having X and Y operands stored therein and a program decoder, the AGU being operably connected to the data memory and the program decoder, the AGU comprising:

alu means for generating addresses of the X and Y operands and including a first and second alu (Arithmethic Logic Unit), a first and second triplet of registers with the fiqrst triplet of registers being operably associated with the first alu and the second triplet of registers being operably associated with the second alu, each of the first and second alu comprising a first stage comprising (Distributed Binary Look-Ahead Carry) adder having an A input, a B input, a carry input connected to receive a first control signal, and a summation output, the first stage further including a means for by passing the first DBLC adder, and selection means for selecting either the summation output or the means for by passing the first DBLC adder as a first output; a second stage that is in parallel with the first stage and including a Carry Sum Adder (csa) having a (csa) A input, a (csa) B input, a (csa) Carry input, a (csa) sum output and a (csa) carry output, a second DBLC adder having a second A inpjut connected to the (csa) carry output, a second B input connected to the (csa) sum output, asecond carry input connected to receive a second control signal, and a second summation output which produces a second output and output selection means for selecting under the control of a third control signal either the first output or the second output as a result; an arithmetic selection means under the control of a fourth control signal for selecting either a first arithmetic or a second arithmetic method of generating the result;

control signal means for generating the first, second, third and fourth control signals; and conversion means for converting the result from the first and second alus into the X and Y operands.

2. The AGU according to claim 1 wherein the first and second arithmetic methods comprise: a linear and a modulo method.

3. The AGU actording to claim 2 further comprising means for selecting either a third or fourth arithmetic method which methods comprise: multiple wrap around modulo and reverse carry.

4. The AGU according to claim 3 wherein the first and second triplets of registers comprise: a set of address registers, a set of offset registers, and a set of modifier registers.

5. The AGU according to claim 4 wherein for each triplet there is an address register which contents can be offset by a value stored in an offset register and can be modified by a value stored in a modifier register.

6. The AGU according to claim 5 further comprising:

means for selecting the first and second alus;

means for selecting the first alu address registers having a base address stored therein, offset registers and modifier registers, and means for selecting the second alu address registers having a base address stored therein, offset registers, and modifier registers.

7. The AGU according to claim 6 wherein an address and the first and second arithmetic methods comprise:

means for linearly incrementing the base address by the value stored in the offset register; and means for modulo incrementing the base address by the value stored in the offset registers plus the one's compliment of the value stored in the modifier registers.

8. The AGU according to claim 6 wherein the first and second arithmetic methods further comprise: means for linearly incrementing the base address by the ones compliment of thevalue stored in the offset register plus one; and means for modulo incrementing the base address by the one's compliment of the value stored in the offset registers plus one plus the one's compliment of the value stored in the modifier registers.

9. The AGU according to claim 6 wherein the first and second arithmetic methods further comprise: means for linearly incrementing the base address by the one's compliment of the value stored in the offset register plus one; and means for modulo incrementing the base address by the one's compliment of the value stored in the offset registers plus the value stored in the modifier registers plus one.

10. The AGU according to claim 6 wherein the first and second arithmetic methods further comprise: means for linearly incrementing the base address by the value stored in the offset register; and means for modulo incrementing the base address by the value stored in the offset registers plus the value stored in the modifier registers plus one.

11. The AGU according to claim 6 wherein an address and the third arithmetic method comprises:

means for reversing the bit order of the base address to obtain a reverse address;

means for revering the bit order of the offset value stored in the offset registers to obtain a reverse offset address;

means for incrementing the reverse address by the reverse offset address to obtain a first result, means for reversing the bit order of the first result to obtain a first result address.

12. The AGU according to claim 6 wherein an address and the third arithmetic method further comprises:

means for reversing the bit order of the base address to obtain a reverse address;

means for revering the bit order of the offset value stored in the offset registers to obtain a reverse offset address;

means for obtaining the one's compliment of the reverse offset address to obtain a compliment address;

means for incrementing the reverse address by the compliment address plus one to obtain a gecond result; and, means for reversing the bit order of the second result to obtain a second result address.

13. A method for generating a memory address for X and Y outputs for a processor having an addressable data memory and a program decoder, the AGU being operably connected to the data memory and the program decoder, the method comprising:

generating addresses for the X and Y operands using a first and second alu (Arithmetic Logic Unit), a first and second triplet of registers with the first triplet of registers being operably associated with the first alu and the second triplet of registers being operably associated with the second alu, each of the first and second alu comprising a first stage comprising a first DBLC (Distrubuted Binary Look-Ahead Carry) adder having an A input, a B input, a carry input connected to receive a first control signal, and a summation output, the method further including the step of passing the first DBLC adder, and selecting either the summation output or the by passed of the first DBLC adder as a first output; in a second stage that is in parallel with the first stage and including a Carry Sum Adder (csa) having a (csa) A input, a (ca) B input, a (csa) Carry input, a (csa) sum output and a (csa) carry output, a second DBLC adder having a second A input connected to the (csa) carry output, a second B input connected to the (csa) sum output, a second carry input connected to receive a second control signal, and a second summation output which produces a second output. The method further comprising the steps of selecting under the control of a third control signal either the first output or the second output as a result; under the control of a fourth control signal selecting either a first arithmetic or a second arithmetic method of generating the result;

generating the first, second, third and fourth control signals; and converting the result from the first and second alus into an address for the X and Y operands.

14. The method according to claim 13 further comprising:

selecting the first alu's triplets of registers including an address register having a base address stored therein, an offset register and a modifier register, selecting the second alu's triplets of registere including an address register having a base address stored therein, an offset register and a modifier register.

15. The method according to claim 14 further comprising:

linearly incrementing the base address by the value stored in the offset register; and modulo incrementing the base address by the value stored in the offset registers plus the one's compliment of the value stored in the modifier registers.

16. The method according to claim 14 comprising:

linearly incrementing the base address by the one's compliment of the value stored in the offset register plus one; and modulo incrementing the base address by the ones compliment of the value stored in the offset registers plus one plus the one's compliment of the value stored in the modifier registers.

17. The method according to claim 14 comprising:

linearly incrementing the base address by the one's compliment of the value stored in the offset register plus one; and modulo incrementing the base address by the one's compliment of the value stored in the offset registers plus the value stored in the modifier registers plus one.

18. The method according to claim 14 comprising:

linearly incrementing the base address by the vralue stored in the offset register; and modulo incremnenting the base address by the value stored in the offset registers plus the value stored in the modifier registers plus one.

19. The rmethod according to claim 14 comprising;

reversing the bit order of the base address to obtain a reverse address;

revering the bit order of the offset value stored in the offset registers to obtain a reverse offset address;

incrementing the reverse address by the reverse offset address to obtain a first result, reversing the bit order of the first result to obtain a first result address.

20. The method according to claim 14 comprising:

reversing the bit order of the base address to obtain a reverse address;

revering the bit order of the offset value stored in the offset registers to obtain a reverse offset address;

obtaining the one's complimnent of the reverse offset address to obtain a compliment address;

incrementing the reverse address by the compliment address plus one to obtain a second result; and, means for reversing the bit order of the second result to obtain a second result address.

* * * * *